United States Patent
Shubert et al.

(10) Patent No.: US 11,225,046 B2
(45) Date of Patent: Jan. 18, 2022

(54) GYPSUM BOARD WITH PERFORATED COVER SHEET AND SYSTEM AND METHOD FOR MANUFACTURING SAME

(71) Applicant: United States Gypsum Company, Chicago, IL (US)

(72) Inventors: Dale M. Shubert, Geneva, IL (US); Ronald E. Schenck, Valparaiso, IN (US); Thomas Gregory Rowland, North Olmsted, OH (US); John Matthew Willi, Westlake, OH (US)

(73) Assignee: United States Gypsum Company, Chicago, IL (US)

( * ) Notice: Subject to any disclaimer, the term of this patent is extended or adjusted under 35 U.S.C. 154(b) by 65 days.

(21) Appl. No.: 15/473,303

(22) Filed: Mar. 29, 2017

(65) Prior Publication Data

US 2018/0065336 A1  Mar. 8, 2018

Related U.S. Application Data

(60) Provisional application No. 62/385,062, filed on Sep. 8, 2016.

(51) Int. Cl.
*B32B 3/26* (2006.01)
*B26D 1/12* (2006.01)
(Continued)

(52) U.S. Cl.
CPC .............. *B32B 3/266* (2013.01); *B26D 1/125* (2013.01); *B26D 7/2628* (2013.01); *B26D 11/00* (2013.01);
(Continued)

(58) Field of Classification Search
CPC ......... B32B 3/266; B32B 13/14; B32B 38/04; B32B 38/0004; B32B 13/08;
(Continued)

(56) References Cited

U.S. PATENT DOCUMENTS

| 1,500,452 A | 7/1924 | Haggerty |
| 1,702,729 A | 2/1929 | Hite |

(Continued)

FOREIGN PATENT DOCUMENTS

| AT | 406048 B | 1/2000 |
| AU | 486746 | 11/1975 |

(Continued)

OTHER PUBLICATIONS

European Patent Office, International Search Report and the Written Opinion in International Application No. PCT/US2017/050587 (dated Dec. 20, 2017).

(Continued)

*Primary Examiner* — Michael N Orlando
*Assistant Examiner* — Christopher W Raimund
(74) *Attorney, Agent, or Firm* — Leydig, Voit & Mayer, Ltd.; Philip T. Petti; Pradip K. Sahu

(57) ABSTRACT

Embodiments of a system and a method for manufacturing a gypsum board can be used to produce a gypsum board having at least one perforated cover sheet via a cover sheet perforator system. The cover sheet perforator system can include a perforator roller is disposed downstream of a forming station along a machine direction, a roller support frame for rotatably supporting the perforator roller such that its rotational axis extends along the cross-machine direction, and a motor arranged with the perforator roller to rotate the perforator roller about the rotational axis. The drive motor can be adapted to rotate the perforator roller with a tangential speed substantially equal to the line speed to produce a series of perforation holes in an upwardly-facing cover sheet as the gypsum board moves past the perforator roller.

19 Claims, 7 Drawing Sheets

(51) Int. Cl.
  *B26F 1/20* (2006.01)
  *B26F 1/08* (2006.01)
  *B28B 19/00* (2006.01)
  *B28B 11/12* (2006.01)
  *B28B 7/16* (2006.01)
  *B26D 7/26* (2006.01)
  *B32B 13/14* (2006.01)
  *B26D 11/00* (2006.01)
  *E04C 2/04* (2006.01)
  *B26F 1/10* (2006.01)
  *B32B 13/08* (2006.01)
  *B32B 38/00* (2006.01)
  *B32B 38/04* (2006.01)

(52) U.S. Cl.
  CPC .......... *B26F 1/08* (2013.01); *B26F 1/10* (2013.01); *B26F 1/20* (2013.01); *B28B 7/164* (2013.01); *B28B 11/12* (2013.01); *B28B 19/0092* (2013.01); *B32B 13/08* (2013.01); *B32B 13/14* (2013.01); *B32B 38/0004* (2013.01); *B32B 38/04* (2013.01); *E04C 2/04* (2013.01); *E04C 2/043* (2013.01); *B32B 2038/047* (2013.01); *B32B 2250/03* (2013.01); *B32B 2305/02* (2013.01); *B32B 2315/18* (2013.01); *B32B 2317/12* (2013.01); *B32B 2607/00* (2013.01)

(58) Field of Classification Search
  CPC ............ B32B 2607/00; B32B 2317/12; B32B 2315/18; B32B 2305/02; B32B 2250/03; B32B 2038/047; B32B 13/04; B26D 7/2628; B26D 11/00; B26D 1/125; E04C 2/043; E04C 2/04; B28B 7/164; B28B 11/12; B28B 19/0092; B26F 1/08; B26F 1/20; B26F 1/10
  See application file for complete search history.

(56) References Cited

U.S. PATENT DOCUMENTS

| | | |
|---|---|---|
| 2,017,022 A | 10/1935 | Roos |
| 2,080,009 A | 5/1937 | Roos |
| 2,346,999 A | 6/1937 | Briscoe |
| 2,322,194 A | 6/1943 | King |
| 2,336,251 A | 12/1943 | Hoggatt |
| 2,803,575 A | 8/1957 | Riddell et al. |
| 2,806,811 A | 9/1957 | Von Hazmburg |
| 2,965,528 A | 12/1960 | Loechl |
| 3,179,529 A | 4/1965 | Hickey et al. |
| 3,227,854 A * | 1/1966 | Ramsey ............... B26F 1/24 219/244 |
| 3,260,027 A | 7/1966 | Page et al. |
| 3,300,371 A | 1/1967 | Hart |
| 3,359,146 A | 12/1967 | Lane et al. |
| 3,382,636 A | 5/1968 | Green |
| 3,513,009 A | 5/1970 | Sauer et al. |
| 3,573,947 A | 4/1971 | Kinkade et al. |
| 3,649,319 A | 3/1972 | Smith |
| 3,674,726 A | 7/1972 | Kirk |
| 3,692,620 A | 9/1972 | Schmidt et al. |
| 3,908,062 A | 9/1975 | Roberts |
| 3,926,650 A | 12/1975 | Lange et al. |
| 3,944,698 A | 3/1976 | Dierks et al. |
| 3,947,285 A | 3/1976 | Jones et al. |
| 3,993,822 A | 11/1976 | Knauf et al. |
| 4,009,062 A | 2/1977 | Long |
| 4,051,291 A | 9/1977 | Long |
| 4,054,461 A | 10/1977 | Martin |
| 4,184,887 A | 1/1980 | Lange et al. |
| 4,195,109 A | 3/1980 | Long |
| 4,195,110 A | 3/1980 | Dierks et al. |
| 4,233,368 A | 11/1980 | Baehr et al. |
| 4,237,260 A | 12/1980 | Lange et al. |
| 4,265,979 A | 5/1981 | Baehr et al. |
| 4,292,364 A | 11/1981 | Wesch et al. |
| 4,327,146 A | 4/1982 | White |
| 4,392,896 A | 7/1983 | Sakakibara |
| 4,455,271 A | 6/1984 | Johnson |
| 4,518,652 A | 5/1985 | Willoughby |
| 4,612,682 A * | 9/1986 | Holz ............... A22C 9/004 452/142 |
| 4,725,477 A | 2/1988 | Kole et al. |
| 4,965,031 A | 10/1990 | Conroy |
| 5,085,929 A | 2/1992 | Bruce et al. |
| 5,116,671 A | 5/1992 | Bruce et al. |
| 5,224,315 A | 7/1993 | Winter et al. |
| 5,227,100 A | 7/1993 | Koslowski et al. |
| 5,277,122 A * | 1/1994 | Almaraz ............ E01B 29/32 104/17.2 |
| 5,320,677 A | 6/1994 | Baig |
| 5,373,674 A | 12/1994 | Winter et al. |
| 5,397,631 A | 3/1995 | Green et al. |
| 5,534,059 A | 7/1996 | Immordino, Jr. |
| 5,565,252 A | 10/1996 | Finestone |
| 5,575,844 A | 11/1996 | Bradshaw |
| 5,580,637 A | 12/1996 | Konta et al. |
| 5,595,595 A | 1/1997 | Glenn |
| 5,643,510 A | 7/1997 | Sucech |
| 5,683,635 A | 11/1997 | Sucech et al. |
| 5,714,001 A | 2/1998 | Savoly et al. |
| 5,714,032 A | 2/1998 | Ainsley et al. |
| 5,788,857 A | 8/1998 | Yang et al. |
| 5,876,563 A | 3/1999 | Greenwood |
| 5,908,521 A | 6/1999 | Ainsley et al. |
| 5,922,447 A | 7/1999 | Baig |
| 5,962,119 A | 10/1999 | Chan |
| 6,110,575 A | 8/2000 | Haga |
| 6,171,388 B1 | 1/2001 | Jobbins |
| 6,190,476 B1 | 2/2001 | Seecharan et al. |
| 6,221,521 B1 | 4/2001 | Lynn et al. |
| 6,340,388 B1 | 1/2002 | Luongo |
| 6,342,284 B1 | 1/2002 | Yu et al. |
| 6,387,172 B1 | 5/2002 | Yu et al. |
| 6,391,958 B1 | 5/2002 | Luongo |
| 6,398,864 B1 | 6/2002 | Przybysz et al. |
| 6,403,688 B1 | 6/2002 | Luongo |
| 6,406,537 B1 | 6/2002 | Immordino |
| 6,409,819 B1 | 6/2002 | Ko |
| 6,409,824 B1 | 6/2002 | Veeramasuneni et al. |
| 6,409,825 B1 | 6/2002 | Yu et al. |
| 6,443,258 B1 | 9/2002 | Putt et al. |
| 6,475,313 B1 | 11/2002 | Peterson et al. |
| 6,481,171 B2 | 11/2002 | Yu et al. |
| 6,485,821 B1 | 11/2002 | Bruce et al. |
| 6,489,040 B1 | 12/2002 | Rohlf et al. |
| 6,494,609 B1 | 12/2002 | Wittbold et al. |
| 6,524,679 B2 | 2/2003 | Hauber et al. |
| 6,547,901 B1 | 4/2003 | Gerlich et al. |
| 6,572,698 B1 | 6/2003 | Ko |
| 6,599,621 B2 | 7/2003 | Porter |
| 6,613,424 B1 | 9/2003 | Putt et al. |
| 6,632,550 B1 | 10/2003 | Yu et al. |
| 6,656,858 B1 | 12/2003 | Cahill |
| 6,706,128 B2 | 3/2004 | Sethuraman |
| 6,711,872 B2 | 3/2004 | Anderson |
| 6,743,830 B2 | 6/2004 | Soane et al. |
| 6,746,781 B2 | 6/2004 | Francis et al. |
| 6,774,146 B2 | 8/2004 | Savoly et al. |
| 6,780,356 B1 | 8/2004 | Putt et al. |
| 6,783,587 B2 | 8/2004 | Sethuraman et al. |
| 6,800,131 B2 | 10/2004 | Yu et al. |
| 6,808,793 B2 | 10/2004 | Randall |
| 6,815,049 B2 | 11/2004 | Veeramasuneni et al. |
| 6,822,033 B2 | 11/2004 | Yu et al. |
| 6,831,118 B2 | 12/2004 | Munzenberger |
| 6,832,652 B1 | 12/2004 | Dillenbeck et al. |
| 6,838,163 B2 | 1/2005 | Smith et al. |
| 6,841,232 B2 | 1/2005 | Tagge et al. |
| 6,874,930 B2 | 4/2005 | Wittbold et al. |
| 6,878,321 B2 | 4/2005 | Hauber et al. |

(56) References Cited

U.S. PATENT DOCUMENTS

| | | | |
|---|---|---|---|
| 6,893,752 B2 | 5/2005 | Veeramasuneni et al. |
| 6,941,720 B2 | 9/2005 | DeFord et al. |
| 6,983,821 B2 | 1/2006 | Putt et al. |
| 6,986,812 B2 | 1/2006 | Dubey et al. |
| 7,007,914 B2 | 3/2006 | Petersen et al. |
| 7,296,919 B2 | 11/2007 | Petersen et al. |
| 7,364,676 B2 | 4/2008 | Sucech et al. |
| 7,425,236 B2 | 9/2008 | Yu et al. |
| 7,445,738 B2 | 11/2008 | Dubey et al. |
| 7,455,728 B2 | 11/2008 | Losch et al. |
| 7,470,338 B2 | 12/2008 | Callais et al. |
| 7,661,511 B2 | 2/2010 | Hasegawa |
| 7,736,720 B2 | 6/2010 | Yu et al. |
| 7,740,700 B2 | 6/2010 | Wallner |
| 7,776,170 B2 | 8/2010 | Yu et al. |
| 7,789,645 B2 | 9/2010 | Dubey et al. |
| 7,799,410 B2 | 9/2010 | Tinianov |
| 7,811,413 B2 | 10/2010 | Hennis et al. |
| 7,851,057 B2 | 12/2010 | Englert et al. |
| 7,932,193 B2 | 4/2011 | Kajander |
| 8,065,853 B2 | 11/2011 | Tonyan et al. |
| 8,204,698 B2 | 6/2012 | Li et al. |
| 8,597,426 B2 | 12/2013 | Lee et al. |
| 8,702,881 B2 | 4/2014 | Yu et al. |
| 8,801,852 B2 | 8/2014 | Lee et al. |
| 9,296,124 B2 | 3/2016 | Rago et al. |
| 2001/0001218 A1 | 5/2001 | Luongo |
| 2002/0017222 A1 | 2/2002 | Luongo |
| 2002/0045074 A1 | 4/2002 | Yu et al. |
| 2002/0112651 A1 | 8/2002 | Yu et al. |
| 2002/0139082 A1 | 10/2002 | DeFord et al. |
| 2003/0019176 A1 | 1/2003 | Anderson |
| 2003/0084980 A1 | 5/2003 | Seufert et al. |
| 2003/0089061 A1 | 5/2003 | DeFord et al. |
| 2003/0092784 A1 | 5/2003 | Tagge et al. |
| 2004/0005484 A1 | 1/2004 | Veeramasuneni et al. |
| 2004/0026002 A1 | 2/2004 | Weldon et al. |
| 2004/0038065 A1 | 2/2004 | Francis |
| 2004/0045481 A1 | 3/2004 | Sethuraman et al. |
| 2004/0092625 A1 | 5/2004 | Pollock et al. |
| 2004/0131714 A1 | 7/2004 | Burke |
| 2004/0134585 A1 | 7/2004 | Callais et al. |
| 2004/0152379 A1 | 8/2004 | McLarty et al. |
| 2004/0231916 A1 | 11/2004 | Englert et al. |
| 2005/0019618 A1 | 1/2005 | Yu et al. |
| 2005/0061237 A1 | 3/2005 | Dubey et al. |
| 2005/0064164 A1 | 3/2005 | Dubey et al. |
| 2005/0067082 A1 | 3/2005 | Mowry |
| 2005/0121131 A1 | 6/2005 | Hennis et al. |
| 2005/0142347 A1 | 6/2005 | Takahara et al. |
| 2005/0181693 A1 | 8/2005 | Kajander |
| 2005/0219938 A1 | 10/2005 | Rigaudon et al. |
| 2005/0223949 A1 | 10/2005 | Bailey et al. |
| 2005/0263925 A1 | 12/2005 | Heseltine et al. |
| 2006/0196391 A1 | 9/2006 | Hassan et al. |
| 2006/0243171 A1 | 11/2006 | Yu et al. |
| 2006/0244183 A1 | 11/2006 | Wittbold et al. |
| 2006/0248999 A1* | 11/2006 | Monteil ............... B26D 7/2628 |
| | | | 83/469 |
| 2006/0278133 A1 | 12/2006 | Yu et al. |
| 2006/0278135 A1 | 12/2006 | Liu et al. |
| 2007/0032393 A1 | 2/2007 | Patel et al. |
| 2007/0048490 A1 | 3/2007 | Yu et al. |
| 2007/0059513 A1 | 3/2007 | Yu et al. |
| 2007/0082170 A1 | 4/2007 | Colbert et al. |
| 2007/0102237 A1 | 5/2007 | Baig |
| 2007/0141304 A1* | 6/2007 | Agrawal ............... B28B 11/12 |
| | | | 428/138 |
| 2008/0057318 A1 | 3/2008 | Adzima et al. |
| 2008/0070026 A1 | 3/2008 | Yu et al. |
| 2008/0087366 A1 | 4/2008 | Yu et al. |
| 2008/0090068 A1 | 4/2008 | Yu |
| 2008/0101150 A1* | 5/2008 | George ............... B01F 3/1221 |
| | | | 366/8 |
| 2008/0190062 A1 | 8/2008 | Engbrecht et al. |
| 2008/0251198 A1 | 10/2008 | Tinianov |
| 2008/0257222 A1 | 10/2008 | Wallner |
| 2009/0011212 A1 | 1/2009 | Dubey et al. |
| 2009/0029141 A1 | 1/2009 | Shake et al. |
| 2009/0126300 A1 | 5/2009 | Fujiwara et al. |
| 2009/0208714 A1 | 8/2009 | Currier et al. |
| 2010/0143682 A1 | 6/2010 | Shake et al. |
| 2010/0197182 A1 | 8/2010 | Barzilai |
| 2010/0222457 A1 | 9/2010 | Wallner |
| 2010/0247937 A1 | 9/2010 | Liu et al. |
| 2011/0024028 A1 | 2/2011 | Immordino et al. |
| 2011/0046898 A1 | 2/2011 | Li et al. |
| 2011/0054053 A1 | 3/2011 | Lee et al. |
| 2011/0195241 A1 | 8/2011 | Yu et al. |
| 2011/0210164 A1 | 9/2011 | Babinsky et al. |
| 2012/0168527 A1 | 7/2012 | Li et al. |
| 2012/0170403 A1 | 7/2012 | Li et al. |
| 2012/0207989 A1 | 8/2012 | Xu et al. |
| 2013/0098268 A1 | 4/2013 | Li et al. |
| 2013/0099027 A1 | 4/2013 | Li et al. |
| 2013/0099418 A1 | 4/2013 | Li et al. |
| 2013/0100759 A1 | 4/2013 | Wittbold et al. |
| 2013/0216717 A1 | 8/2013 | Rago et al. |
| 2013/0216762 A1 | 8/2013 | Chan et al. |
| 2013/0233880 A1 | 9/2013 | Rago et al. |
| 2013/0308411 A1 | 11/2013 | Wittbold et al. |
| 2014/0000979 A1 | 1/2014 | Dugan et al. |
| 2014/0073711 A1 | 3/2014 | Lee et al. |
| 2014/0113124 A1 | 4/2014 | Sang et al. |
| 2014/0113128 A1 | 4/2014 | Yijun et al. |
| 2014/0322395 A1 | 10/2014 | Thompson |
| 2014/0335365 A1 | 11/2014 | Wada et al. |
| 2014/0374955 A1* | 12/2014 | Jean ............... B28B 11/0863 |
| | | | 264/284 |
| 2015/0010767 A1 | 1/2015 | Sang et al. |
| 2015/0266270 A1 | 9/2015 | Yu et al. |
| 2017/0362124 A1 | 12/2017 | Sang et al. |

FOREIGN PATENT DOCUMENTS

| | | |
|---|---|---|
| CN | 1238312 A | 12/1999 |
| CN | 1396138 A | 2/2003 |
| CN | 101065223 A | 10/2007 |
| CN | 101189126 A | 5/2008 |
| CN | 203383442 U | 1/2014 |
| CN | 104453150 A * | 3/2015 |
| CN | 104453150 A | 3/2015 |
| CN | 204343592 U | 5/2015 |
| CN | 105522652 A | 4/2016 |
| DE | 3238093 A | 4/1984 |
| DE | 4316518 A1 | 11/1994 |
| EP | 0335405 A2 | 10/1989 |
| EP | 1008568 A1 | 6/2000 |
| FR | 2673620 A1 | 9/1992 |
| GB | 1028890 A | 5/1966 |
| GB | 1170444 A | 11/1969 |
| GB | 1250713 A | 10/1971 |
| GB | 1381457 A | 1/1975 |
| GB | 1561232 A | 2/1980 |
| GB | 2053779 A | 2/1981 |
| JP | H02-128843 A | 5/1990 |
| JP | H05-148001 A | 6/1993 |
| JP | 2005-537149 A | 12/2005 |
| JP | 2009-270380 A | 11/2009 |
| JP | 2013-209287 A | 10/2013 |
| KR | 1020060123582 A | 12/2006 |
| NO | 126524 B | 2/1973 |
| RU | 135961 U1 | 12/2013 |
| SU | 1588551 A1 | 8/1991 |
| WO | WO 1996/026166 A1 | 8/1996 |
| WO | 1997/023398 A1 | 7/1997 |
| WO | WO-9723398 A1 * | 7/1997 ............ B26D 1/626 |
| WO | WO 1999/016984 A1 | 4/1999 |
| WO | WO 2000/049246 | 8/2000 |
| WO | WO 2001/045932 A1 | 6/2001 |
| WO | WO 2001/081263 A1 | 11/2001 |
| WO | WO 2003/000620 A1 | 1/2003 |
| WO | WO 2005/106156 A1 | 11/2005 |
| WO | WO 2009/007971 A1 | 1/2009 |

(56) References Cited

FOREIGN PATENT DOCUMENTS

| WO | 2014/066079 A3 | 5/2014 |
|---|---|---|
| WO | WO 2014/066207 A1 | 5/2014 |
| WO | WO 2014/066283 A1 | 5/2014 |
| WO | WO 2015/185143 A1 | 12/2015 |

OTHER PUBLICATIONS

Allen, "Computed Tomography of the Antikythera Mechanism," *Abstracts of 5th World Congress on Industrial Process Tomography*, Bergen, Norway, Abstract No. P04, p. 88 (Sep. 6, 2007).

Alme et al., "3D Reconstruction of 10000 Particle Trajectories in Real-time" *Abstracts of 5th World Congress on Industrial Process Tomography*, Bergen, Norway, Abstract No. VIA05, p. 91 (Sep. 6, 2007).

AZom.com, AZO Materials Particle Size—US Sieve Series and Tyler Mesh Size Equivalents, obtained from the internet at http://www.azom.com/Details.asp?ArticleID=1417 on Jan. 21, 2011; Date added: May 15, 2002.

Banasiak et al., "Application of Charge Simulation Method (CSM) for ECT Imaging in Forward Problem and Sensitivity Matrix Calculation" *Abstracts of 5th World Congress on Industrial Process Tomography*, Bergen, Norway, Abstract No. VIA02, p. 89 (Sep. 6, 2007).

Bickford, "Designing for abuse resistance," pp. 11-14; USG Corporation, Chicago, Illinois (1995).

Burrows, "A Decade's Experience of Gypsum Board Weight Reduction in the U.S.", 14. Internationale Baustofftagung 1.0197-1.0207 (Weimar, Sep. 20-23, 2000).

Deffenbaugh et al. "Comparison of Starch Pasting Properties in the Brabender Viscoamylograph and the Rapid Visco-Analyzer," *Cereal Chemistry*, vol. 66, No. 6, pp. 493-499 (1989).

Diloflo® GW Products Bulletin, "Polynaphthalene Sulfonate, Sodium Salt", GEO Specialty Chemicals, Horsham, PA (Nov. 1999).

Global Gypsum Magazine, "Gypsum Process Engineering Industrial and Thermal Equipment" 7 pages (Nov. 2012).

Hyonic PFM33 Products Bulletin, "Zero VOC Foaming Agent For Gypsum Wallboard", GEO Specialty Chemicals, Horsham, PA (Jul. 2000).

Janaszewski et al., "Adaptive 3D Algorithm to Detect Bridging Ligaments during Intergranular Stress Corrosion Cracking of Stainless Steel," *Abstracts of 5th World Congress on Industrial Process Tomography*, Bergen, Norway, Abstract No. VIA03, p. 90 (Sep. 6, 2007).

Li et al., "Updating Sensitivity Maps in Landweber Iteration for Electrical Capacitance Tomography" *Abstracts of 5th World Congress on Industrial Process Tomography*, Bergen, Norway, Abstract No. VIA04, p. 90 (Sep. 6, 2007).

Lin et al., "Characterization and Analysis of Porous, Brittle Solid Structures by Micro CT," *Abstracts of 5th World Congress on Industrial Process Tomography*, Bergen, Norway, Paper No. VIA07, p. 92 (Sep. 6, 2007).

Maad et al., "Comparing Analysis of Image Visualisation Accuracy of Electrical Capacitance Tomography and Gamma Tomography" *Abstracts of 5th World Congress on Industrial Process Tomography*, Bergen, Norway, Abstract No. VIA01, p. 89 (Sep. 6, 2007).

Peterson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto, Canada, pp. 9-1-9-16 (May 2000).

Ship et al., "Thermophysical Characterization of Type X Special Fire Resistant Gypsum Board", Proceedings of the Fire and Materials 2011 Conference, San Francisco, Jan. 31-Feb. 2, 2011, Interscience Communications Ltr., London, UK, p. 417-426.

"Standard Test Methods for Physical Testing of Gypsum Panel Products", Annual Book of ASTM Standards, Designations: C 473-97, vol. 04:01 pp. 253-263 (1998).

Wirsching et al., "Calcium Sulfate" Ullmann's Encyclopedia of Industrial Chemistry, 5th Edition, vol. A4, pp. 1, 15 (Dec. 20, 1985).

Videla et al., "Watershed Functions Applied to a 3D Segmentation Problem for the Analysis of Packed Particle Beds," *Part. Part. Syst. Charact.*23: 237-245 (2006).

Xiong et al., "Wavelet Enhanced Visualisation and Solids Distribution in the Top of Circulating Fluidized Beds" *Abstracts of 5th World Congress on Industrial Process Tomography*, Bergen, Norway, Abstract No. VIA06, p. 91 (Sep. 6, 2007).

European Patent Office, International Search Report and the Written Opinion in International Application No. PCT/US2016/038737 (dated Sep. 21, 2016).

Celanese, "Complete Textile Glossary," Celanese Acetate, LLC, p. 62 (2001).

Marshall Additive Technologies, "KAYOCELS.RTM. Cellulose and Cellulose Compounds," obtained from http://www.rjmarshall.com/wp-content/uploads/2013/08/White-Kayocels-TDS.pdf Feb. 2013).

* cited by examiner

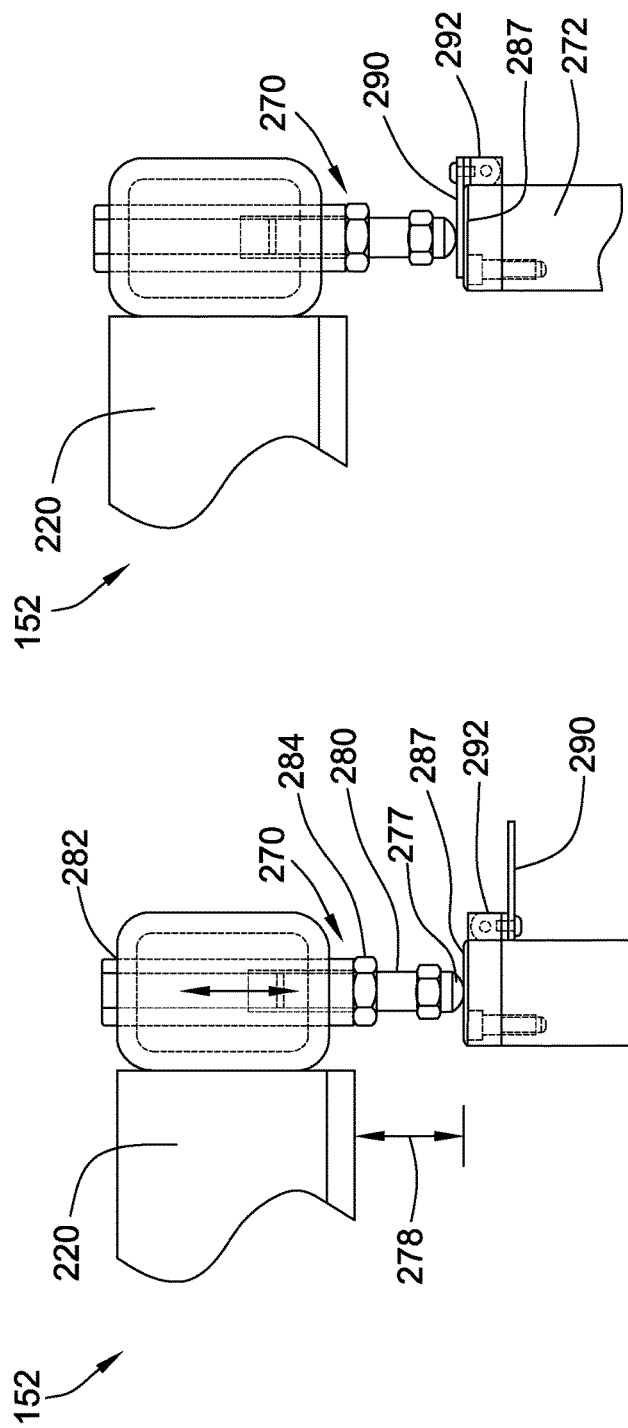

GYPSUM BOARD WITH PERFORATED COVER SHEET AND SYSTEM AND METHOD FOR MANUFACTURING SAME

CROSS-REFERENCE TO RELATED APPLICATION

This patent application claims the benefit of priority to U.S. Provisional Patent Application No. 62/385,062, filed Sep. 8, 2016, and entitled, "System and Method for Manufacturing Gypsum Board With Perforated Cover Sheet," which is incorporated in its entirety herein by this reference.

BACKGROUND

The present disclosure relates to continuous gypsum board manufacturing processes and, more particularly, to a system and method for manufacturing gypsum boards with a perforated cover sheet.

In many types of cementitious articles, set gypsum (calcium sulfate dihydrate) is often a major constituent. For example, set gypsum is a major component of end products created by use of traditional plasters (e.g., plaster-surfaced internal building walls), and also in faced gypsum board employed in typical drywall construction of interior walls and ceilings of buildings. In addition, set gypsum is the major component of gypsum/cellulose fiber composite boards and products, as described in U.S. Pat. No. 5,320,677, for example. Typically, such gypsum-containing cementitious products are made by preparing a mixture of calcined gypsum (calcium sulfate alpha or beta hemihydrate and/or calcium sulfate anhydrite), water, and other components, as appropriate to form cementitious slurry. The cementitious slurry and desired additives are often blended in a continuous mixer, as described in U.S. Pat. No. 3,359,146, for example.

In a typical gypsum board manufacturing process, gypsum board is produced by uniformly dispersing calcined gypsum (commonly referred to as "stucco") in water to form aqueous calcined gypsum slurry. The aqueous calcined gypsum slurry is typically produced in a continuous manner by inserting stucco and water and other additives into a mixer which contains means for agitating the contents to form a uniform gypsum slurry. The slurry is continuously directed toward and through a discharge outlet of the mixer and into a discharge conduit connected to the discharge outlet of the mixer. Aqueous foam can be combined with the aqueous calcined gypsum slurry in the mixer and/or in the discharge conduit. A stream of foamed slurry passes through the discharge conduit from which it is continuously deposited onto a moving web of cover sheet material (i.e., the face sheet) supported by a forming table. The foamed slurry is allowed to spread over the advancing face sheet. A second web of cover sheet material (i.e., the back sheet) is applied to cover the foamed slurry and form a sandwich structure of a continuous wallboard preform. The wallboard preform is subjected to forming, such as at a conventional forming station, to obtain a desired thickness.

The calcined gypsum reacts with the water in the wallboard preform to form a matrix of crystalline hydrated gypsum or calcium sulfate dihydrate and sets as a conveyor moves the wallboard preform down the manufacturing line. The hydration of the calcined gypsum provides for the formation of an interlocking matrix of set gypsum, thereby imparting strength to the gypsum structure in the gypsum-containing product. The gypsum slurry becomes firm as the crystal matrix forms and holds the desired shape.

After the wallboard preform is cut into segments downstream of the forming station at a point along the line where the preform has set sufficiently, the segments are flipped over, dried (e.g., in a kiln) to drive off excess water, and processed to provide the final wallboard product of desired dimensions. The aqueous foam produces air voids in the set gypsum, thereby reducing the density of the finished product relative to a product made using a similar slurry but without foam.

Prior devices and methods for addressing some of the operational problems associated with the production of gypsum wallboard are disclosed in commonly-assigned U.S. Pat. Nos. 5,683,635; 5,643,510; 6,494,609; 6,874,930; 7,007,914; and 7,296,919, which are incorporated by reference. There is a continued need in the art to provide additional solutions to enhance the production of cementitious boards. For example, there is a continued need for techniques for drying cementitious boards in an effective manner to drive off the excess water remaining after the hydration process.

It will be appreciated that this background description has been created by the inventors to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein.

SUMMARY

In one aspect, the present disclosure is directed to embodiments of a system for manufacturing a gypsum board having a perforated cover sheet. In one embodiment, a system for manufacturing a gypsum board includes a forming station, a conveyor, and a cover sheet perforator system. The gypsum board has a gypsum core, a first cover sheet, and a second cover sheet. The gypsum core is interposed between the first and second cover sheets.

The forming station is adapted to form the gypsum board such that the gypsum board is within a predetermined thickness range. The conveyor is adapted to convey the gypsum board along a machine direction away from the forming station. The conveyor is configured to support the gypsum board such that the first cover sheet of the gypsum board is resting upon the conveyor. The conveyor extends along the machine direction and along a cross-machine direction. The cross-machine direction is perpendicular to the machine direction.

The cover sheet perforator system includes a perforator roller, a roller support frame, and a motor. The perforator roller is disposed downstream of the forming station along the machine direction. The perforator roller is rotatably mounted to the roller support frame such that the perforator roller is rotatable about a rotational axis. The roller support frame supports the perforator roller such that the rotational axis extends along the cross-machine direction. The roller support frame is adapted to place the perforator roller in contacting relationship with the second cover sheet of the gypsum board conveyed by the conveyor. The drive motor is arranged with the perforator roller to rotate the perforator roller about the rotational axis. The drive motor is adapted to rotate the perforator roller to produce a series of perforation holes in the second cover sheet as the gypsum board moves past the perforator roller.

In another aspect, the present disclosure describes embodiments of a method of manufacturing a gypsum board having a perforated cover sheet. In one embodiment, a method of manufacturing a gypsum board includes conveying the gypsum board along a machine direction away from a forming station to a perforator roller. The gypsum board has a core interposed between a first cover sheet and a second cover sheet. The core comprises an aqueous gypsum slurry. The gypsum board extends along the machine direction and along a cross-machine direction. The cross-machine direction is perpendicular to the machine direction. The perforator roller is disposed downstream of the forming station along the machine direction.

The gypsum board is passed along the machine direction underneath the perforator roller. The perforator roller is in contacting relationship with the second cover sheet of the gypsum board. The perforator roller is rotated via a drive motor about a rotational axis extending along the cross-machine direction to produce a series of perforation holes in the second cover sheet as the gypsum board moves past the perforator roller in the machine direction.

In still another aspect, the present disclosure is directed to embodiments of a gypsum board having a perforated cover sheet and a core with a strengthened layer. In one embodiment, a gypsum board includes a first cover sheet, a second cover sheet, and a core. The core is interposed between the first and second cover sheets. The core includes a core layer and a concentrated layer. The core layer includes set gypsum formed from a core slurry comprising at least water and stucco. The concentrated layer includes set gypsum formed from a concentrated slurry comprising at least water, stucco, and an enhancing additive. The enhancing additive is present in a more concentrated amount (by weight percentage) in the concentrated slurry than what is present in the core slurry. At least one of the cover sheets is perforated such that said cover sheet defines a plurality of perforation holes therein.

Further and alternative aspects and features of the disclosed principles will be appreciated from the following detailed description and the accompanying drawings. As will be appreciated, the systems and techniques for manufacturing gypsum boards with a perforated cover sheet that are disclosed herein are capable of being carried out and used in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 7 is an enlarged, fragmentary, end elevational view of the roller bracket, as indicated by oval VII in FIG. 1, having a locating rod mounted thereto and of a bracket stop adapted to be mounted to the conveyor of the manufacturing system of FIG. 1.

FIG. 8 is a view similar to that in FIG. 7, but illustrating a stop pad interposed between the locating rod and the bracket stop.

Figure 1:
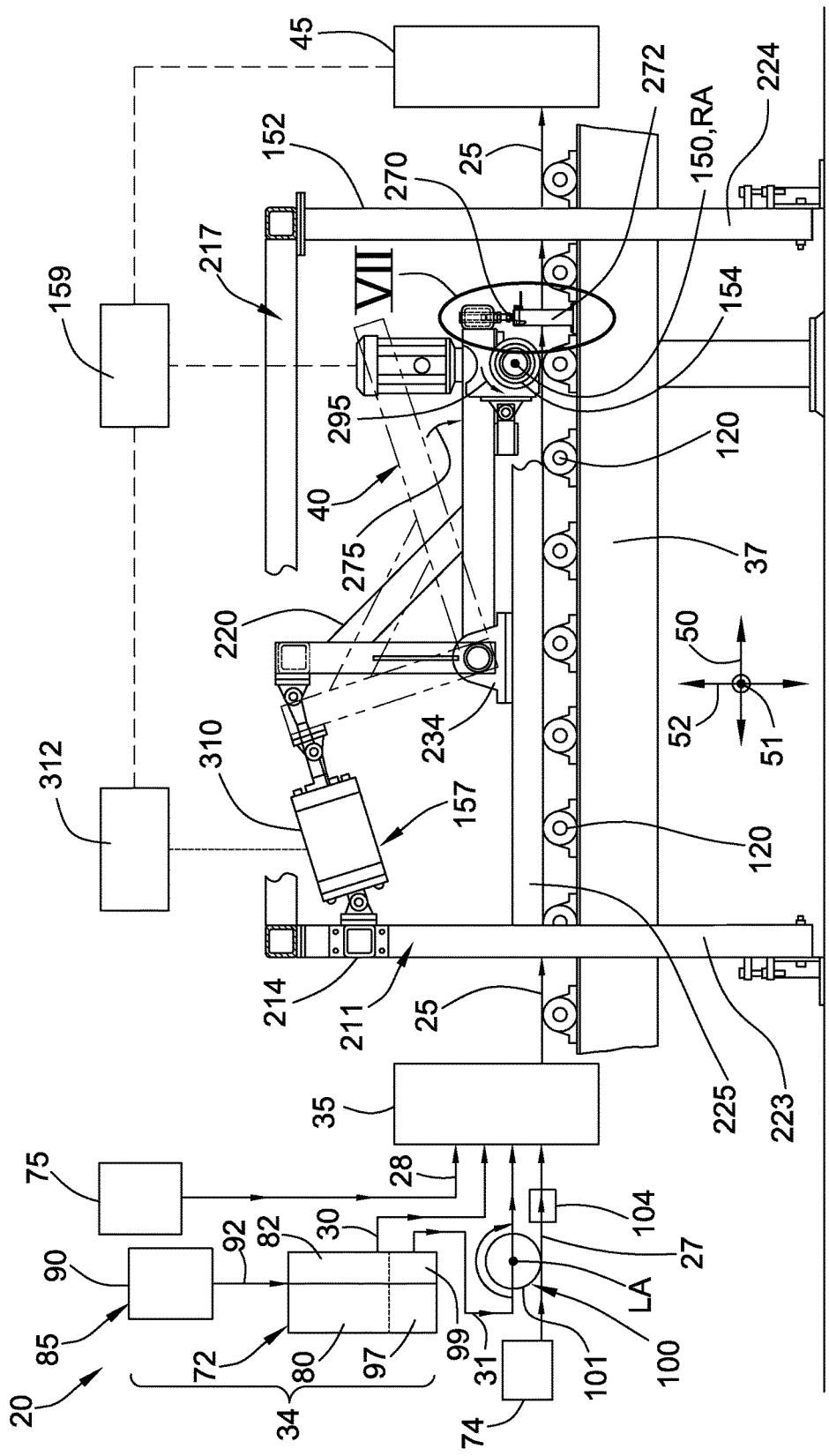
FIG. 1 is a fragmentary, schematic side elevational view of an embodiment of a system for manufacturing a cementitious board made from an aqueous cementitious slurry in the form of a gypsum wallboard manufacturing line which is constructed in accordance with principles of the present disclosure, the system including an embodiment of a cover sheet perforator system which is constructed in accordance with principles of the present disclosure and is positioned at a predetermined location along the manufacturing line between a forming station and a cutting station.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DETAILED DESCRIPTION OF EXEMPLARY EMBODIMENTS

The present disclosure provides various embodiments of a system and a method for manufacturing a gypsum board that include means and steps for perforating a cover sheet of the gypsum board that can be used in connection with the manufacture of various cementitious products, including gypsum wallboard, for example. In embodiments of systems and methods for manufacturing a gypsum board following principles of the present disclosure, a cover sheet perforator system can include a perforator roller, a roller support frame, and a drive motor.

The perforator roller is rotatably mounted to the roller support frame such that the perforator roller is rotatable about its longitudinal axis. The roller support frame supports the perforator roller over a conveyor such that the longitudinal axis of the perforator roller extends along a cross-machine direction of the conveyor, which is perpendicular to a machine direction along which the conveyor carries gypsum board from the wet end of the board line toward a cutting station. In embodiments, the roller support frame can be adapted to selectively vary the position of the perforator roller over the conveyor along a normal axis, which is perpendicular to both the machine direction and the cross-machine direction, to selectively adjust the depth of penetration of the pins of the perforator roller into the cover sheet of the gypsum board. In embodiments, the cover sheet perforator system can be configured to produce perforation holes in the rear cover sheet that facilitate the drying of excess water remaining in the gypsum board in a kiln while helping to prevent the formation of steam within the board (or to provide an outlet for any steam formed in the board) during the drying process.

In embodiments, the drive motor is arranged with the perforator roller to variably rotate the perforator roller about its longitudinal axis. In embodiments, the drive motor can be controlled to rotate the perforator roller such that the perforator roller has a tangential speed at its outer circumference that is substantially equal to a nominal line speed of the gypsum board being carried by the conveyor along the machine direction from the wet end of the board line toward the knife at the cutting station.

The present disclosure is directed to embodiments of a gypsum board having a first cover sheet, a second cover sheet, and a core. The core is interposed between the first and second cover sheets. The core includes a core layer and a concentrated layer. The core layer includes set gypsum formed from a core slurry comprising at least water and stucco. The concentrated layer includes set gypsum formed from a concentrated slurry comprising at least water, stucco, and an enhancing additive. The enhancing additive is present in a more concentrated amount (by weight percentage) in the concentrated slurry than what is present in the core slurry. At least one of the cover sheets is perforated such that said cover sheet defines a plurality of perforation holes therein.

In embodiments, the concentrated layer is contiguous with the first cover sheet, and the core layer is interposed between the concentrated layer and the second cover sheet. In embodiments, the second cover sheet is perforated. In embodiments, the second cover sheet is contiguous with the second cover sheet which is perforated In embodiments, a gypsum board made according to principles of the present disclosure includes at least one layer made from slurry with a formulation that is different from the formulation of the slurry used to make a core layer of the gypsum board. In embodiments, the formulation of the slurry that forms the concentrated layer can include a strengthening additive in an amount that is more concentrated (by weight percentage) than the amount of the same strengthening additive in the formulation of the core slurry. In embodiments, the concentrated layer can comprise a "concentrated layer" that is made using techniques and cementitious slurry formulations as described in U.S. Patent Application Nos. 62/184,060, filed Jun. 24, 2015; 62/290,361, filed Feb. 2, 2016; Ser. No. 15/186,176, filed Jun. 17, 2016; Ser. No. 15/186,212, filed Jun. 17, 2016; Ser. No. 15/186,232, filed Jun. 17, 2016; and Ser. No. 15/186,257, filed Jun. 17, 2016, which are incorporated herein by reference in their entireties.

Turning now to the Figures, an embodiment of a system 20 for manufacturing a gypsum board 25 constructed according to principles of the present disclosure is shown in FIG. 1. The illustrated gypsum board 25 includes a first cover sheet 27, a second cover sheet 28, and a gypsum core having a core layer 30 and a concentrated layer 31. The gypsum core 30, 31 is interposed between the first and second cover sheets 27, 28 (see also, FIG. 9).

The illustrated system 20 includes a wet end system 34, a forming station 35, a conveyor 37, a cover sheet perforator system 40, and a cutting station 45. The wet end system 34 and the forming station 35 are configured to mix and assemble constituent materials together such that a continuous gypsum board 25 having a predetermined nominal thickness is fed from the forming station 35 along the conveyor 37 in a machine direction 50 toward the cutting station 45. The conveyor 37 is adapted to move the gypsum board 25 along the machine direction 50 past the cover sheet perforator system 40 toward the cutting station 45. The gypsum board 25 has a pair of edges extending along the machine direction 50. The edges are disposed in lateral spaced relationship to each other along a cross-machine direction 51 which is perpendicular to the machine direction 50. The cover sheet perforator system 40 is adapted to perforate the second cover sheet 28 over a predetermined width of the second cover sheet 28 (measured along the cross-machine direction 51) as the gypsum board 25 moves past it along the machine direction 50 toward the cutting station 45. The cutting station 45 is adapted to periodically cut the gypsum board 25 into board segments of a predetermined length (measured along the machine direction 50).

In the illustrated embodiment, the wet end system 34 is configured as a gypsum wallboard wet end system. The wet end system 34 can include any suitable equipment adapted to mix and/or assemble the constituent materials forming the gypsum board 25. In the illustrated embodiment, the wet end system 34 includes a cementitious slurry mixing and dispensing system 72 adapted to produce a core slurry that forms the core layer 30 and a concentrated slurry that forms the concentrated layer 31 of the gypsum board 25 (see also, FIG. 9). In embodiments, the core slurry 30 includes at least water and calcined gypsum (commonly referred to as "stucco"). In embodiments, the core slurry 30 comprises a foamed gypsum slurry that includes, water, stucco, and an aqueous foam. In embodiments, the concentrated slurry 31 includes at least water, stucco, and an enhancing additive. The enhancing additive is present in a more concentrated amount (by weight percentage) in the concentrated slurry 31 than what is present in the core slurry 30. In embodiments, the core slurry 30 and the concentrated slurry 31 can be formed in any suitable manner.

A first roll 74 of cover sheet material is configured to be selectively dispensed such that the first cover sheet 27 is dispensed from the first roll 74 upstream of the slurry mixing and dispensing system 72 and conveyed upon a forming table extending between the slurry mixer and dispensing system 72 and the forming station 35. A second roll 75 of cover sheet material is configured to be selectively dispensed such that the second cover sheet 28 is dispensed from the second roll 75 at a position between the slurry mixing and dispensing system 72 and the forming station 35 over the first cover sheet 27 and the concentrated layer 31 and the core layer 30 dispensed from the slurry mixing and dispensing system 72. Gypsum board products are typically formed "face down" such that the first cover sheet 27 dispensed from the first roll 74 traveling over the forming table serves as the "face" cover sheet 27 of the finished gypsum board 25.

In the illustrated embodiment, the slurry mixing and dispensing system 72 includes a main mixer 80, a main discharge conduit 82, and a foam injection system 85. The main mixer 80 is adapted to agitate water and a cementitious material (e.g., stucco) to form the core slurry is configured to form the core layer 30 of the gypsum board 25. The main mixer 80 is in fluid communication with the main discharge conduit 82. Both the water and the calcined gypsum can be respectively supplied to the main mixer 80 via one or more inlets as is known in the art. In embodiments, any other suitable gypsum slurry additive can be supplied to the main mixer 80 as is known in the art of manufacturing cementitious products.

Any suitable mixer (e.g., a pin mixer) can be used with the slurry mixing and dispensing system 72. In embodiments, the main mixer 80 can be a suitable, commercially-available mixer, as is known in the gypsum board manufacturing art, such as, for example, one available from Gypsum Technologies Inc. or John Broeders Machine, both of Ontario, Canada.

In embodiments, the main mixer 80 defines a mixing chamber in which is disposed a rotatable agitator. The agitator can include a radially extending disc to which is attached a generally vertical drive shaft positioned along a normal axis 52, which is perpendicular to both the machine direction 50 and the cross-machine direction 51. The drive shaft can extend through the upper wall of the main mixer 80. The drive shaft can be connected to a conventional drive source, such as, a motor, for example, for rotating the drive shaft at a suitable speed (e.g., 275-300 rpm) appropriate for rotating the agitator to mix the contents of the mixing chamber of the main mixer 80. This rotation directs the resulting aqueous slurry in a generally centrifugal direction, such as in a clockwise outward spiral. It should be appreciated that this discussion of an agitator is meant only to indicate the basic principles of agitators commonly employed in gypsum slurry mixing chambers known in the art. Alternative agitator designs, including those employing pins, paddles, plows, rings, etc., are contemplated.

The main discharge conduit 82 is in fluid communication with the main mixer 80 and is configured to deliver a main flow of the core slurry 30 from the main mixer 80 downstream to a further manufacturing station (e.g., the forming station 35, as shown in FIG. 1). The core slurry 30 can be discharged from the main discharge conduit 82 in an outlet flow direction substantially along the machine direction 50. In the illustrated embodiment, which can be used to produce a cementitious board in the form of a gypsum board, the main discharge conduit 82 is adapted to deposit the core slurry 30 upon the first cover sheet 27 advancing in the machine direction 50 at a location where the first cover sheet 27 is supported by a forming table extending between the cementitious slurry mixing and dispensing system 72 and the forming station 35.

The main discharge conduit 82 can be made from any suitable material and can have different shapes, including any suitable conventional discharge conduit known to one skilled in the art. In some embodiments, the discharge conduit can comprise a flexible conduit. In embodiments, the main discharge conduit 82 can comprise any suitable discharge conduit component as will be appreciated by one skilled in the art, such as a foam injection body of the foam injection system 85, a flow-modifying element, and a slurry distributor, for example.

In embodiments, one or more flow-modifying elements can be associated with the discharge conduit 82 and adapted to modify the flow of the core slurry 30 discharged from the main mixer 80 through the discharge conduit 82. In embodiments, the flow-modifying element is disposed downstream of a foam injection body which is part of the discharge conduit 82 and the aqueous foam supply conduit relative to a flow direction of the flow of cementitious slurry from the main mixer 80 through the discharge conduit 82. The flow-modifying element(s) can be used to control an operating characteristic of the flow of the core slurry 30 moving through the discharge conduit 82. Examples of suitable flow-modifying elements include volume restrictors, pressure reducers, constrictor valves, canisters etc., including those described in U.S. Pat. Nos. 6,494,609; 6,874,930; 7,007,914; and 7,296,919, for example.

In embodiments, the main discharge conduit 82 can include a slurry distributor which can be any suitable terminal portion of a conventional discharge conduit, such as a length of conduit in the form of a flexible hose or a component commonly referred to as a "boot." In embodiments, the boot can be in the form of a multi-leg discharge boot. In yet other embodiments, the slurry distributor of the discharge conduit 82 can be similar to one as shown and described in U.S. Patent Application Publication Nos. 2012/0168527; 2012/0170403; 2013/0098268; 2013/0099027; 2013/0099418; 2013/0100759; 2013/0216717; 2013/0233880; and 2013/0308411, for example. In some of such embodiments, the discharge conduit 82 can include suitable components for splitting a main flow of the core slurry 30 from the main mixer 80 into two flows which are recombined in the slurry distributor.

In embodiments, the foam injection system 85 is arranged with at least one of the main mixer 80 and the slurry discharge conduit 82. The foam injection system 85 can include a foam source 90 (e.g., such as a foam generation system configured as known in the art), a foam supply conduit 92, and a suitable foam injection body.

In embodiments, any suitable foam source 90 can be used. Preferably, the aqueous foam is produced in a continuous manner in which a stream of a mix of foaming agent and water is directed to a foam generator, and a stream of the resultant aqueous foam leaves the generator and is directed to and mixed with the gypsum slurry. In embodiments, any suitable foaming agent can be used. Some examples of suitable foaming agents are described in U.S. Pat. Nos. 5,683,635 and 5,643,510, for example.

In embodiments, the aqueous foam supply conduit 92 can be in fluid communication with at least one of the main mixer 80 and the discharge conduit 82. An aqueous foam from the foam source 90 can be added to the constituent materials through the foam supply conduit 92 at any suitable location downstream of the main mixer 80 in the discharge conduit 82 and/or in the main mixer 80 itself to form a foamed gypsum slurry.

In embodiments, the foam injection body comprises a part of at least one of the main mixer 80 and the slurry discharge conduit 82. For example, in embodiments, the aqueous foam supply conduit 92 has a manifold-type arrangement for supplying foam to a number of foam injection ports within the foam injection body, which can be in the form of an injection ring or block, associated with the discharge conduit 82, such as is described in U.S. Pat. No. 6,874,930, for example. In embodiments, a flow-modifying element is disposed downstream of the foam injection body and the aqueous foam supply conduit 92 relative to a flow direction of the flow of core slurry 30 from the mixer 80 through the discharge conduit 82.

In embodiments, the foam supply conduit 92 can be in fluid communication with the discharge conduit 82 and one or more secondary foam supply conduits can be provided which are in fluid communication with the main mixer 80. In yet other embodiments, the aqueous foam supply conduit(s) 92 can be in fluid communication with the main mixer alone 80. In embodiments, the foam injection body can be part of a transition piece (commonly referred to as a "gate") mounted to the outlet of the mixer 80. As will be appreciated by those skilled in the art, the means for introducing aqueous foam into the cementitious slurry in the slurry mixing and dispensing assembly 72, including its relative location in the assembly, can be varied and/or optimized to provide a uniform dispersion of aqueous foam in the core slurry 30 to produce board that is fit for its intended purpose.

In embodiments, one or both of the cover sheets 27, 28 of the gypsum board 25 can be treated with a relatively denser layer of gypsum slurry (relative to the core slurry 30 from which the board core is made), often referred to as a "skim coat" in the art, if desired. To that end, in embodiments, the main mixer 80 can include an auxiliary conduit that is adapted to deposit a stream of dense aqueous cementitious slurry that is relatively denser than the core slurry 30 deposited from the discharge conduit 82.

In embodiments, an auxiliary conduit can be provided for depositing a skim coat layer to the back cover sheet 28. For example, in embodiments, the main mixer 80 can direct a flow of aqueous calcined gypsum slurry through an auxiliary conduit (i.e., a "back skim coat stream") that is relatively denser than the main flow of the foamed core slurry 30 dispensed from the main discharge conduit 82. A back skim coat station can include suitable equipment for applying the back skim coat, such as, for example, a back skim coat roller disposed over a support element such that the second cover sheet 28 being dispensed from the second roll 75 is disposed therebetween. The auxiliary conduit can deposit the back skim coat stream upon the moving second cover sheet 28 upstream (in the direction of movement of the second cover sheet 28) of the back skim coat roller that is adapted to apply a skim coat layer to the second cover sheet 28 being dispensed from the second roll 75 as is known in the art.

In embodiments, a suitable front skim coat stream of gypsum slurry can be produced that has a density which is greater than that of the core slurry 30 being dispensed from the main discharge conduit 82. In embodiments, the slurry mixing and dispensing system 72 can include any suitable arrangement of skim coating equipment to apply the front skim coat to the first cover sheet 27, including suitable equipment to produce a gypsum board having hard edges, as one skilled in the art will readily understand.

Figure 9:
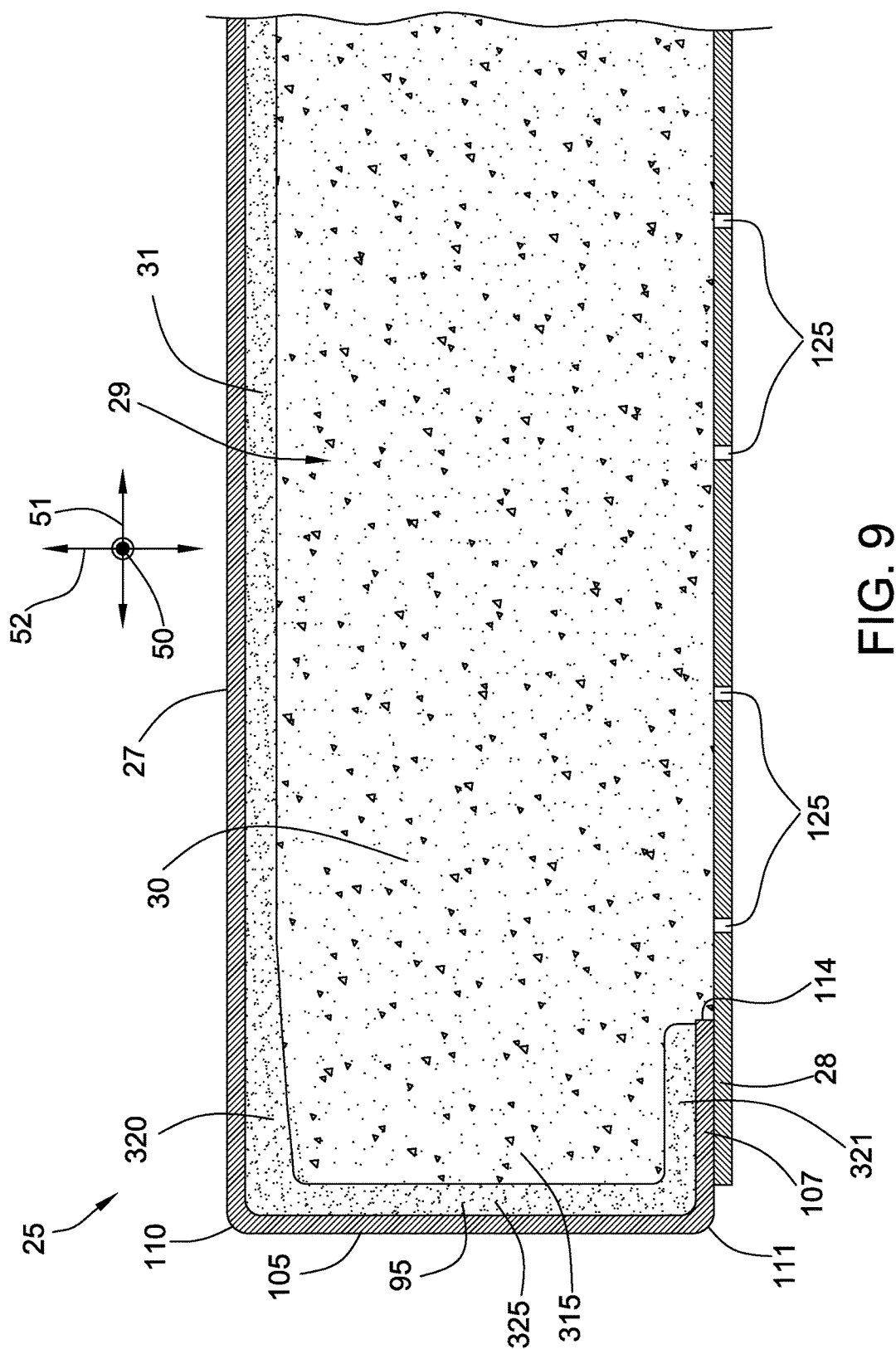
FIG. 9 is a fragmentary, schematic transverse sectional view of an embodiment of a gypsum board constructed in accordance with principles of the present disclosure.

In the illustrated embodiment, the concentrated slurry is used to form the concentrated layer 31, which is contiguous with the first cover sheet 27, and edge layers 95 of the gypsum board 25 (one of which being shown in FIG. 9). In other embodiments, a different source of slurry can be used to form the concentrated layer 31 across the field of the face cover sheet 27 than what is used for the edge layer(s) 95 (see also, FIG. 9). In at least some of such embodiments, the edge layer(s) 95 of the gypsum board 25 can be made from a slurry with a formulation that is different from at least one of the core slurry used to produce the core layer 30 and the concentrated slurry used to produce the concentrated layer 31 in the field of the board 25.

In embodiments, the concentrated slurry 31 can be provided via any suitable source. In embodiments, the source of the concentrated slurry 31 is provided via a technique described in U.S. Patent Application Nos. 62/184,060, filed Jun. 24, 2015; 62/290,361, filed Feb. 2, 2016; Ser. No. 15/186,176, filed Jun. 17, 2016; Ser. No. 15/186,212, filed Jun. 17, 2016; Ser. No. 15/186,232, filed Jun. 17, 2016; and Ser. No. 15/186,257, filed Jun. 17, 2016.

In embodiments, one mixer can be used to produce both the core and the concentrated slurries 30, 31. For example, in embodiments, the main mixer 80 can be the source of the concentrated slurry 31. In at least some of such embodiments, an auxiliary discharge conduit can be in fluid communication with the main mixer 80 and can be adapted to direct a flow of slurry from the main mixer 80 through the auxiliary discharge conduit. One or more enhancing additives can be added to the slurry in the auxiliary discharge conduit coming from the main mixer 80 to form the strengthened slurry.

In the illustrated embodiment, the source of the concentrated slurry 31 comprises a second mixer 97 in fluid communication with a second discharge conduit 99. In embodiments, the second mixer 97 can be any suitable mixer adapted to mix the constituent ingredients into a uniform aqueous dispersion of the concentrated slurry to make the concentrated layer 31 and, in at least some embodiments, the edge layers 95 to produce board that is fit for its intended purpose. In embodiments, the second mixer 97 used to produce the concentrated slurry 31 can be similar to the main mixer 80 in overall operational principle and construction but have a smaller mixing volume capacity than that of the main mixer 80 because the amount of concentrated slurry 31 used to produce the gypsum board 25 is less than the amount of core slurry 30 that is discharged from the main mixer 80 to produce the core layer 30.

In embodiments, the mixers 80, 97 can be connected in series or can be independent of each other. In the illustrated embodiment, the second mixer 97 is operated independently of the main mixer 80. The second mixer 97 includes independent ingredient feeds and inlets in order to deliver the constituent ingredients comprising the formulation of the concentrated slurry 31 to the second mixer 97 using any suitable technique known to those skilled in the art. In other embodiments, the mixers 80, 97 can be connected in series and slurry can be delivered via an auxiliary conduit from the main mixer 80 to the second mixer 97 to further process the slurry from the main mixer 80 to produce the concentrated slurry 31.

The second discharge conduit 99 can be similar in operational principle and construction to the main discharge conduit 82. In embodiments, the second discharge conduit 99 can include any suitable discharge conduit component as known to those skilled in the art. In embodiments, the second discharge conduit 99 is adapted to dispense the concentrated slurry 31 at a point upstream of a roller as is described in U.S. Patent Application Nos. 62/184,060, filed Jun. 24, 2015; 62/290,361, filed Feb. 2, 2016; Ser. No. 15/186,176, filed Jun. 17, 2016; Ser. No. 15/186,212, filed Jun. 17, 2016; Ser. No. 15/186,232, filed Jun. 17, 2016; and Ser. No. 15/186,257, filed Jun. 17, 2016.

In other embodiments, separate auxiliary conduits can be connected to the main mixer 80 to deliver one or more separate streams to the face cover sheet 27. Other suitable equipment (such as auxiliary mixers) can be provided in the auxiliary conduits to help make the slurry therein denser, such as by mechanically breaking up foam in the slurry and/or by chemically breaking up the foam through use of a suitable de-foaming agent inserted into the auxiliary conduit(s) through a suitable inlet. In other embodiments, an auxiliary conduit can direct slurry from the main mixer 80 into a second mixer 97 and/or include a suitable inlet for incorporating at least one enhancing additive therein to form a strengthened slurry having at least one ingredient which is more concentrated in the concentrated slurry 31 than in the core slurry 30 to form a slurry suitable for use as a concentrated layer and/or as edge layer(s) as described herein.

In embodiments, an edge forming assembly can be provided that is adapted to form at least one edge of the gypsum board 25 that includes a layer made from a slurry having a formulation that is different from the formulation of the core slurry 30 used to produce the core layer of the board 25. In embodiments, the edge forming assembly can be constructed in accordance with principles described in U.S. Patent Application No. 62/366,492, filed on Jul. 25, 2016, which is incorporated herein by reference in its entirety.

In embodiments, the edge forming assembly is adapted to form edges of a gypsum board that each includes a layer 95 made from the concentrated slurry 31. In embodiments, the concentrated slurry 31 includes at least one enhancing additive in an amount that is more concentrated (by percentage weight) in the concentrated slurry 31 from which the edge layers 95 are made than in the core slurry 30 from which the core layer 30 of the gypsum board 25 is made (see also, FIG. 9).

Referring to FIG. 1, in the illustrated embodiment, an edge forming assembly is adapted to provide the concentrated layer 31 across the face cover sheet 27 in conjunction with providing the edge layers 95 at the lateral edges of the gypsum board 25 via a coating roller assembly 100. The edge forming assembly can also include an edge bead regulating system, an edge layer forming device for each edge bead, and a cover sheet folding system for each edge of the first cover sheet 27 as shown and described in U.S. Patent Application No. 62/366,492, filed on Jul. 25, 2016.

Referring to FIG. 1, in the illustrated embodiment, the coating roller assembly 100 is provided to apply the concentrated slurry 31 substantially across the width of the face cover sheet 27 to form the concentrated layer 31 and to direct a pair of edge beads of the concentrated slurry 31 respectively to the edges of the face cover sheet 27 to form a pair of edge layers 95 (see, e.g., FIG. 9). In the illustrated embodiment, the edge layers 95 are denser than the board core layer formed from the core slurry 30 (see also, FIG. 9) and, in at least some embodiments, can have the same density as the concentrated layer 31.

In embodiments, the coating roller assembly 100 includes a coating roller 101, a roller shaft, and a motor. The coating roller 101 is mounted to the roller shaft, which in turn is journaled for rotation about its longitudinal axis LA. The motor is arranged with the roller shaft to selectively and variably rotate the coating roller 1010 about the longitudinal axis LA.

In the illustrated embodiment, the concentrated slurry 31 discharged from the second mixer 97 forms both the concentrated layer 31 and the edge layers 95 by directing portions of the concentrated slurry 31 around a pair of ends of the coating roller 101 to produce the edge beads and by directing another portion of the concentrated slurry 31 over the top of the coating roller 101 to apply the concentrated layer 31 to the face cover sheet 27. The coating roller 101 is configured such that it has a length, measured between a pair of ends along the cross machine direction 51 that is less than the width of the face cover sheet 27, which is measured between the edges of the face cover sheet 27 along the cross machine direction 51.

In embodiments, the source of the concentrated slurry 31 can deposit the concentrated slurry 31 upon the face cover sheet 27 upstream of the coating roller 101 which is adapted to apply a layer of the concentrated slurry 31 substantially across the width of the moving face cover sheet 27 as a concentrated layer 31 and to define the edge beads at the periphery of the moving face cover sheet 27 by virtue of the length of the coating roller being less than the width of the moving face cover sheet 27. The coating roller 101 is disposed downstream of the site where the concentrated slurry 31 is deposited from the second discharge conduit 99 onto the face cover sheet 27 and upstream of the site where the core slurry 30 is deposited from the main discharge conduit 82 onto the face cover sheet 27 (with the concentrated layer 31 interposed along the normal axis 51 between the core slurry 30 and the face cover sheet 27). Other equipment as described in U.S. Patent Application No. 62/366,492, filed on Jul. 25, 2016, can be provided that is adapted to convert the edge beads into the edge layers 95.

In embodiments, the concentrated slurry 31 can have a formulation that is different from the formulation of the core slurry 30 produced by the main mixer 80. In embodiments, the formulation of the concentrated slurry 31 that forms the concentrated layer can include a strengthening additive in an amount that is more concentrated (by weight percentage) than the amount of the same strengthening additive in the formulation of the core slurry 30. The concentrated layer 31 (and associated edge layer(s) 95) can be formed from a strengthened slurry that includes the enhancing additive, water, and a cementitious material, such as stucco, to form a hydrated cementitious material such as set gypsum in a continuous crystalline matrix. In embodiments, the concentrated slurry 31 can be formulated such that the concentrated layer 31 comprises a "concentrated layer" as described in U.S. Patent Application Nos. 62/184,060, filed Jun. 24, 2015; 62/290,361, filed Feb. 2, 2016; Ser. No. 15/186,176, filed Jun. 17, 2016; Ser. No. 15/186,212, filed Jun. 17, 2016; Ser. No. 15/186,232, filed Jun. 17, 2016; and Ser. No. 15/186,257, filed Jun. 17, 2016, which are incorporated herein by reference in their entireties.

In embodiments, the concentrated slurry 31 can be formulated to include an enhancing additive that provides desired strength properties. In embodiments, the enhancing additive is more concentrated in the concentrated slurry 31 than in the board core slurry 30 (and/or in the resulting layers in the board product), as discussed herein. Examples of suitable enhancing additives that help to provide strength include starch, polyvinyl alcohol, boric acid, gypsum-cement, nano-cellulose, micro-cellulose, or any combination thereof, for example. The use of the singular term enhancing additive herein is used for convenience but will be understood to encompass the plural, i.e., more than one enhancing additive in combination, as one of ordinary skill in the art will readily appreciate. Thus, an enhancing additive may comprise one or more of starch, polyvinyl alcohol, boric acid, gypsum-cement, nano-cellulose, and/or micro-cellulose.

In some embodiments, the enhancing additive comprises an ingredient, such as starch, that is effective to increase the dry strength of the gypsum board 25 relative to the strength of the board 25 without the ingredient, such as, starch (e.g., via increased compressive strength, nail pull resistance, flexural strength, core hardness, or other strength parameter). With respect to starch, any suitable strength enhancing starch can be used, including hydroxyalkylated starches such as hydroxyethylated or hydroxypropylated starch, or a combination thereof, uncooked starches, or pregelatinized starches, which are generally preferred over acid-modifying migrating starches which generally provide paper-core bond enhancement but not core strength enhancement. However, if desired, the acid-modifying migrating starch can be included with the enhancing additive in some embodiments.

The starch can be cooked or uncooked. Uncooked starches are characterized as being cold water insoluble and having a semi-crystalline structure. Typically, uncooked starches are obtained by wet milling and are not modified by heating wet starch as in the case of cooked starches. Cooked starches are characterized by being cold water soluble and having a non-crystalline structure. Cooked starches are prepared by heating wet starch, and can be prepared, e.g., by extrusion techniques. See, e.g., U.S. patent application Ser. Nos. 14/494,547; 14/044,582; and Ser. No. 13/835,002, which extrusion techniques are incorporated by reference.

Cooked starches are sometimes referred to as pregelatinized starches, because the crystalline structure of the starch granules melts, and results in starch gelatinization, which is characterized by the disappearance of the birefringence under a microscope with a polarized light. Preferred starches, whether cooked or uncooked, are different than acid-modified migratory starches which do not confer the same strength properties and are used in the art for paper-core bond enhancement as they migrate to the paper-core interface due to their smaller chain lengths. The acid-modified migratory starches have lower molecular weight, typically below about 6,000 Daltons. In some embodiments, preferred starches in accordance with embodiments of the disclosure have higher molecular weights, e.g., at least about 30,000 Daltons.

For example, in some embodiments, the starch added to the concentrated slurry 31 can have a molecular weight of from about 30,000 Daltons to about 150,000,000 Daltons, e.g., from about 30,000 Daltons to about 150,000,000 Daltons, from about 30,000 Daltons to about 100,000,000 Daltons, from about 30,000 Daltons to about 50,000,000 Daltons, from about 30,000 Daltons to about 10,000,000 Daltons, from about 30,000 Daltons to about 5,000,000 Daltons, from about 30,000 Daltons to about 1,000,000 Daltons, from about 30,000 Daltons to about 500,000 Daltons, from about 30,000 Daltons to about 100,000 Daltons, from about 50,000 Daltons to about 150,000,000 Daltons, from about 50,000 Daltons to about 100,000,000 Daltons, from about 50,000 Daltons to about 50,000,000 Daltons, from about 50,000 Daltons to about 10,000,000 Daltons, from about 50,000 Daltons to about 5,000,000 Daltons, from about 50,000 Daltons to about 1,000,000 Daltons, from about 50,000 Daltons to about 500,000 Daltons, from about 50,000 Daltons to about 100,000 Daltons, from about 100,000 Daltons to about 150,000,000 Daltons, from about 100,000 Daltons to about 100,000,000 Daltons, from about 100,000 Daltons to about 50,000,000 Daltons, from about 100,000 Daltons to about 10,000,000 Daltons, from about 100,000 Daltons to about 5,000,000 Daltons, from about 100,000 Daltons to about 1,000,000 Daltons, from about 100,000 Daltons to about 500,000 Daltons, or from about 100,000 Daltons to about 100,000 Daltons, etc.

Properties of uncooked starches include having low viscosity in cold water (i.e., at a temperature of 77° F. (25° C.)), while properties of pregelatinized starches include having instant high viscosity in cold water. Uncooked starches tend to have a viscosity of about 10 centipoise or less in cold water (e.g., from about 1 centipoise to about 10 centipoise, such as from about 3 centipoise to about 7 centipoise), as measured according to a modified rapid viscosity analyzer method. The rapid viscosity analyzer method is explained in the text, Deffenbaugh, L. B. and Walker, C. E., "Comparison of Starch Pasting Properties in the Brabender Viscoamylograph and the Rapid Visco-Analyzer," *Cereal Chemistry*, Vol. 66, No. 6, pp. 493-499 (1989), and modified as defined herein with respect to sample preparation and testing profile as follows. Starch (20 g, dry) is added into water (180 g) in a Waring blender (model 31 BL92) while mixing at low speed for 15 seconds. Starch solution (28 g) is weighed into a measuring cup. The paddle speed of the rapid viscosity analyzer is set at 160 rpm. The testing profile is set with an initial temperature of 25° C. for 10 min. Heat to 93° C. at a heating rate of 15° C./min. Keep the temperature at 93° C. for 5 min. Cool to 50° C. at a cooling rate of −15° C./min, and keep at 50° C. for 1 min. The viscosity value measured at 30 seconds is used as the viscosity of the starch.

The pregelatinized starches have "instant" high viscosity in cold water because the starch tends to instantly dissolve in water. Cooked or pregelatinized starches tend to have a cold water viscosity of at least about 100 centipoise (e.g., from about 50 centipoise to about 1000 centipoise, such as from about 350 centipoise to about 1000 centipoise) as measured according to the modified rapid viscosity analyzer method.

In some embodiments, uncooked starches are selected because they are easy to mix with water. This is because of their low viscosity in water. Pregelatinized starches can sometimes cause "fish eye," which is a condition that is characterized by one or more large lumps that form in the water solution during mixing. While not wishing to be bound by any particular theory, during the mixing process, the large lumps are believed to be caused by fast water absorption of the starch, forming a viscous film on the surface of the lump, which prevents water penetration of the lump. Uncooked starches are believed to avoid the fish eye condition because of their cold water insolubility, which results in the separation of starch granules. However, it will be understood that pregelatinized starches can be used in accordance with embodiments of the disclosure inasmuch as they are desirable for the exposure of functional groups which allows for hydrogen bonding between starch and gypsum crystals.

Examples of suitable uncooked starches include, but are not limited to, one or more of native cereal starches, native root starches, native tuber starches, and/or chemically modified starches, with specific representative examples including, e.g., corn starch (normal, waxy, and/or high-amylose), A-type wheat starch, B-type wheat starch, pea starch, acid-modified starches with a molecular weight of at least about 30,000 Daltons, substituted starches having substituted groups (such as acetate, phosphate, hydroxyethyl, hydroxypropyl) on starch hydroxyl groups, or any combination thereof. In some embodiments, the uncooked starch excludes pea starch.

Any suitable pregelatinized starch can be included in the enhancing additive, as described in U.S. Patent Application Publication Nos. 2014/0113124 and US 2015/0010767, which include methods of preparation thereof and desired viscosity ranges described therein. If included, the pregelatinized starch can exhibit any suitable viscosity. In some embodiments, the pregelatinized starch is a mid-range viscosity starch as measured according to the VMA method as known in the art and as set forth in, e.g., U.S. Patent Application Publication No. 2014/0113124, which VMA method is hereby incorporated by reference.

Desirable pregelatinized starches in accordance with some embodiments can have a mid-range viscosity, e.g., measured in a 15 wt. % solution of starch in water, of from about 20 centipoise to about 700 centipoise, e.g., from about from about 20 centipoise to about 600 centipoise, from about 20 centipoise to about 500 centipoise, from about 20 centipoise to about 400 centipoise, from about 20 centipoise to about 300 centipoise, from about 20 centipoise to about 200 centipoise, from about 20 centipoise to about 100 centipoise, from about 30 centipoise to about 700 centipoise, from about 30 centipoise to about 600 centipoise, from about 30 centipoise to about 500 centipoise, from about 30 centipoise to about 400 centipoise, from about 30 centipoise to about 300 centipoise, from about 30 centipoise to about 200 centipoise, from about 30 centipoise to about 100 centipoise, from about 50 centipoise to about 700 centipoise, from about 50 centipoise to about 600 centipoise, from about 50 centipoise to about 500 centipoise, from about 50 centipoise to about 400 centipoise, from about 50 centipoise to about 300 centipoise, from about 50 centipoise to about 200 centipoise, from about 50 centipoise to about 100 centipoise, from about 70 centipoise to about 700 centipoise, from about 70 centipoise to about 600 centipoise, from about 70 centipoise to about 500 centipoise, from about 70 centipoise to about 400 centipoise, from about 70 centipoise to about 300 centipoise, from about 70 centipoise to about 200 centipoise, from about 70 centipoise to about 100 centipoise, from about 100 centipoise to about 700 centipoise, from about 100 centipoise to about 600 centipoise, from about 100 centipoise to about 500 centipoise, from about 100 centipoise to about 400 centipoise, from about 100 centipoise to about 300 centipoise, from about 100 centipoise to about 200 centipoise, etc.

In accordance with some embodiments, the pregelatinized starch can be prepared as an extruded starch, e.g., where starch is prepared by pregelatinization and acid-modification in one step in an extruder as described in U.S. Patent Application Publication No. 2015/0010767, which extrusion method is hereby incorporated by reference. Briefly, any suitable extruder can be used, such as a single-screw extruder (e.g., the Advantage 50 available from American Extrusion International, located in South Beloit, Ill.) or a twin-screw extruder (e.g., the Wenger TX52 available from Wenger located in Sabetha, Kans.). In general, in some embodiments: (a) a precursor to pregelatinized starch, i.e., non-pregelatinized starch, (b) an acid in the form of a weak acid, that substantially avoids chelating calcium ions, and/or a strong acid in a small amount, and (c) water, are mixed and fed into the extruder. In some embodiments, additional water may be added to the extruder. In some embodiments, for example, aluminum sulfate (alum) is an appropriate weak acid to use in preparing the wet starch since it substantially avoids chelating calcium ions.

For example, in some embodiments, weak acid is included in an amount of from about 0.5 wt. % to about 5 wt. % based on the weight of the starch. The amount of strong acid is relatively small, such as about 0.05 wt. % or less by weight of the starch, e.g., from about 0.0001 wt. % to about 0.05 wt. %. The amounts of strong acid used in accordance with some embodiments of the disclosure are considerably smaller than what were included in conventional systems which used, e.g., at least about 2 g of sulfuric acid for 35 g of starch. In some embodiments, the strong acid in small amounts as described above can be used in combination with a weak acid that does not chelate calcium ions, such as alum, as described herein.

While in the extruder, a combination of heating elements and mechanical shearing melts and pregelatinizes the starch, and the weak acid partially hydrolyzes the starch to a desired molecular weight indicated by viscosity as desirable as described herein. For example, the wet starch can be pregelatinized and acid-modified in an extruder having a die at a temperature of from about 150° C. (about 300° F.) to about 210° C. (about 410° F.). Pressure inside the extruder is determined by the raw material being extruded, moisture content, die temperature, and screw speed, which will be recognized by one of ordinary skill in the art. For example, the pressure in the extruder can be at least about 2,000 psi (about 13,800 kPa), e.g., from about 2,000 psi to about 5,000 psi (34,500 kPa). The conditions in the extruder, because of the mechanical energy, will also cause the starch molecules to degrade, which partially produces the same effect of acid-modification. It is believed that because the conditions in an extruder (e.g., high reaction temperature and high pressure) in accordance with some embodiments facilitate this chemical reaction, a weak acid and/or low amounts of a strong acid can be used.

Cold water solubility relates to a pregelatinized starch having any amount of solubility in water at room temperature (about 25° C.). In some embodiments, the pregelatinized starch is partially hydrolyzed and can have desired cold water solubility of from about 70% to about 100%, from about 75% to about 100%, from about 80% to about 100%, from about 85% to about 100%, from about 90% to about 100%, from about 95% to about 100%, from about 70% to about 99%, etc., from about 75% to about 99%, from about 80% to about 99%, from about 85% to about 99%, from about 90% to about 99%, from about 95% to about 99%. In some embodiments, the pregelatinized starch has a cold water viscosity (10% solids, 25° C.) of from about 10 BU to about 120 BU, measured according to the Brabender method where viscosity is measured using a C.W. Brabender Viscograph, e.g., a Viscograph-E that uses reaction torque for dynamic measurement. For example, the cold water viscosity can be, e.g., from about 20 BU to about 110 BU, from about 30 BU to about 100 BU, from about 40 BU to about 90 BU, from about 50 BU to about 80 BU, or from about 60 BU to about 70 BU. It is to be noted that, as defined herein, the Brabender units are measured using a sample cup size of 16 fl. oz (about 500 cc), with a 700 cmg cartridge at an RPM of 75. One of ordinary skill in the art also will readily recognize that the Brabender units can be converted to other viscosity measurements, such as centipoises (e.g., cP=BU×2.1, when the measuring cartridge is 700 cmg) or Krebs units.

In some embodiments, the starch has a cold water viscosity of a 10% slurry of the starch in water when measured at 25° C. of from about 60 cP to about 160 cP, as measured with a Brookfield viscometer with #2 spindle and at a rotation speed of 30 rpm. For example, the cold water viscosity of a 10% slurry of the starch in water when measured at 25° C. can be from about 60 cP to about 150 cP, from about 60 cP to about 120 cP, from about 60 cP to about 100 cP, from about 70 cP to about 150 cP, from about 70 cP to about 120 cP, from about 70 cP to about 100 cP, from about 80 cP to about 150 cP from about 80 cP to about 120 cP, from about 80 cP to about 100 cP, from about 90 cP to about 150 cP, from about 90 cP to about 120 cP, from about 100 cP to about 150 cP, or from about 100 cP to about 120 cP.

If included, the starch of any type described herein as enhancing additive can be present in any suitable amount. In some embodiments, the starch is present in the concentrated slurry 31 for forming the edge layers 95 and/or the concentrated layer 31 in an amount from about 5% to about 40%, by weight of the stucco, e.g., from about 5% to about 35% by weight of the stucco, from about 5% to about 30% by weight of the stucco, from about 5% to about 25%, from about 5% to about 20%, from about 5% to about 15%, from about 5% to about 10%, from about 10% to about 30%, from about 10% to about 25%, from about 10% to about 20%, from about 10% to about 15%, etc. The starch can be present in the core slurry 30 forming the board core in an amount from about 0% to about 4% by weight of the stucco, e.g., from about 0.1% to about 4% by weight of the stucco, from about 0.1% to about 3% by weight of the stucco, from about 0.1% to about 2% by weight of the stucco, from about 0.1% to about 1% by weight of the stucco, from about 1% to about 4% by weight of the stucco, from about 1% to about 3% by weight of the stucco, from about 1% to about 2% by weight of the stucco, etc.

In some embodiments, with or without starch, the enhancing additive can include polyvinyl alcohol and/or boric acid to enhance strength. In some embodiments, polyvinyl alcohol, boric acid, and starch are all present. While not wishing to be bound by theory, it is believed that the boric acid acts as a cross-linker for the polyvinyl alcohol and starch to further enhance starch. In some embodiments, the concentration of polyvinyl alcohol and/or boric acid in the edge layers 95 and/or concentrated layer 31 is believed to positively impact strength in the face paper; this can be compounded by penetrating the face paper with polyvinyl alcohol and/or boric acid as described herein.

If included, the polyvinyl alcohol and boric acid can be present in any suitable amounts. For example, in some embodiments, the polyvinyl alcohol can be present in the concentrated slurry 31 in an amount from about 1% to about 5% by weight of the stucco. In addition, the polyvinyl alcohol can be present in the board core slurry 30 in an amount from about 0% to about 1% by weight of the stucco. The boric acid can be present in the concentrated slurry 31 in an amount from about 0.1% to about 1% by weight of the stucco, and can be present in the board core slurry 30 in an amount from about 0% to about 0.1% by weight of the stucco.

In some embodiments, the enhancing additive optionally comprises nano-cellulose, micro-cellulose, or any combination thereof in order to enhance strength, e.g., nail pull resistance or other strength parameter. If included, the nano-cellulose, micro-cellulose, or combination thereof can be present in any suitable amount such as, for example, in the concentrated slurry 31 in an amount, for example, from about 0.01% to about 2%, e.g., from about 0.05% to about 1% by weight of the stucco, and in the board core slurry 30 in an amount, for example, from about 0% to about 0.5%, e.g., from 0% to about 0.01% by weight of the stucco.

The enhancing additive can comprise gypsum-cement in order to enhance strength, e.g., nail pull resistance or other strength parameter, in some embodiments. The gypsum-cement is optional and can be present in any suitable amount. For example, in some embodiments, it can be included in the concentrated slurry 31 in an amount of from about 5% to about 30% by weight of the stucco, and can be present in the board core slurry 30 in an amount from about 0% to about 10% by weight of the stucco.

In some embodiments, the concentrated slurry 31 for forming the concentrated layer 31 (and/or the edge layers 95) contains at least about 1.2 times the concentration of the enhancing additive as compared with the core slurry 30 for forming the board core layer 30, such as, for example, at least about 1.5 times, at least about 1.7 times, at least about 2 times, at least about 2.5 times, at least about 3 times, at least about 3.5 times, at least about 4 times, at least about 4.5 times, at least about 5 times, at least about 6 times, etc., wherein each of these ranges can have any suitable upper limit as appropriate, such as, for example, about 60, about 50, about 40, about 30, about 20, about 10, about 9, about 8, about 7, about 6.5, about 6, about 5.5, about 5, about 4.5, about 4, about 3.5, about 3, about 2.5, about 2, about 1.5, etc. It will be understood that "higher concentration," as used herein, refers to relative amounts of an enhancing additive (by weight of the stucco), as opposed to gross amounts of ingredients. Since the board core layer 30 provides a higher bulk volume and thickness contribution to the board 25, as compared with such contribution by the concentrated layer 31 and/or the edge layers 95, it is possible that any particular additive may be provided in a higher total gross amount in the board core slurry 30, e.g., in pounds or kilograms, yet be provided in a lower concentration by weight percentage as compared with that in the concentrated slurry 31, i.e., in a lower relative amount, e.g., in weight percentage (wt. %).

In embodiments, the concentrated slurry 31 can be formulated such that the concentrated layer 31 (and in embodiments the edge layers 95) has a density that is greater than the core layer 30 of the board 25. In embodiments, the concentrated slurry 31 is formulated such that the concentrated layer 31 and/or the edge layers 95 produced by the concentrated slurry 31 have a density of at least about 1.1 times higher than a density of the board core layer 30 formed by the core slurry 30 and have a thickness of from about 0.02 inches (about 0.05 cm) to about 0.2 inches (about 0.5 cm) in some embodiments. The board core layer 30 preferably has a thickness greater than the thickness of the concentrated layer 31 (and, when present, the thickness of each of the edge layers 95).

In embodiments, the formulation and production of the concentrated slurry 31 can be similar in other respects to the formulation and production of the "concentrated layer" as described in U.S. Patent Application Nos. 62/184,060, filed Jun. 24, 2015; 62/290,361, filed Feb. 2, 2016; Ser. No. 15/186,176, filed Jun. 17, 2016; Ser. No. 15/186,212, filed Jun. 17, 2016; Ser. No. 15/186,232, filed Jun. 17, 2016; and Ser. No. 15/186,257, filed Jun. 17, 2016. In embodiments, the formulation and production of the core slurry 30 can be similar in other respects to the formulation and production of the slurry used to produce the "board core" as described in U.S. Patent Application Nos. 62/184,060, filed Jun. 24, 2015; 62/290,361, filed Feb. 2, 2016; Ser. No. 15/186,176, filed Jun. 17, 2016; Ser. No. 15/186,212, filed Jun. 17, 2016; Ser. No. 15/186,232, filed Jun. 17, 2016; and Ser. No. 15/186,257, filed Jun. 17, 2016.

Referring to FIG. 1, in embodiments, the wet end system 35 can include a cover sheet folding system 104 adapted to fold each of the edges of the face cover sheet 27 to define an edge wall 105 and a connection flap 107 for use in connecting the face cover sheet 27 and the rear cover sheet 28 (see also, FIG. 9). In embodiments, the cover sheet folding system 104 can include any suitable equipment known to those skilled in the art for such purpose. The cover sheet folding system 104 can use creases 110, 111 disposed adjacent each edge 114 of the face cover sheet 145 to facilitate the formation of the board edge walls 105 and the connection flaps 107 as understood by one skilled in the art (see also, FIG. 9). In embodiments, the creases 110, 111 can be formed adjacent each lateral edge 114 of the cover sheet 27 using any suitable creasing equipment and techniques as known to those skilled in the art.

Referring to FIG. 1, the forming station 35 is adapted to form the gypsum board 25 such that the gypsum board 25 is within a predetermined thickness range. The forming station 35 can comprise any equipment suitable for its intended purpose as is known in the art. For example, in embodiments, the forming station 35 can include a pair of forming plates or rolls in spaced relationship to each other along the normal axis 52 that is substantially perpendicular to the machine direction 50 and to the cross-machine direction 51. The cementitious board 25 passes through the vertically spaced-apart forming plates/rolls to determine the thickness of the cementitious board 25. The forming plate/rolls can be adjustably moved with respect to each other to further refine the thickness of the gypsum board 25 (and when the nominal thickness of the board is changed, e.g., when changing from half-inch thick to ⅝-inch or ⅜-inch thick board, for example) Equipment can be provided that applies an adhesive to secure the back cover sheet 28 to the face cover sheet 27.

The conveyor 37 is adapted to convey the gypsum board 25 along the machine direction 50 away from the forming station 35. The conveyor 37 is configured to support the gypsum board 25 such that the first cover sheet 27 of the gypsum board 25 is resting upon the conveyor 37. The conveyor 37 extends along the machine direction 50 and along the cross-machine direction 51 which is perpendicular to the machine direction 50. The conveyor 37 is adapted to convey the gypsum board 25 at a line speed along the machine direction 50. In embodiments, the conveyor 37 can be configured such that the line speed can be varied (e.g. to increase/decrease the rate of production of the gypsum board 25 and/or to change the thickness of the board being produced, such as when changing from making gypsum board that is nominally a half inch thick to board that is nominally ⅝-inch thick or vice-versa).

The conveyor 37 can be configured such that the edges of the gypsum board 25 extend in substantially parallel relationship with the machine direction 50. In embodiments, the conveyor 37 is configured such that it has a length, measured along the machine direction 50, sufficient to allow the slurry constituting the core 30, 31 to adequately set before reaching the cutting station 45 such that the cementitious board 25 can be cut cleanly.

The conveyor 37 can comprise any equipment suitable for its intended purpose as is known in the art. In the illustrated embodiment, the conveyor 37 includes a plurality of support members 120 that define a support surface. In the illustrated embodiment, the support members 120 of the conveyor 37 comprise rollers that are journaled for rotation. In embodiments, at least a portion of the conveyor 37 can be equipped with a forming belt in overlying relationship to the rollers to help support the cementitious board 25 spanning between the rollers 120 and to help produce a gypsum board 25 having a face cover sheet 27 with a smooth surface.

Referring to FIG. 1, the cover sheet perforator system 40 is adapted to produce a series of perforation holes 125 in the second cover sheet 28 (see also, FIG. 9). In embodiments, the cover sheet perforator system 40 is adapted to perforate the second cover sheet 28 over a predetermined width of the second cover sheet 28 (measured along the cross-machine direction 51) as the gypsum board 25 moves past it along the machine direction 50 toward the cutting station 45. In embodiments, the cover sheet perforator system 40 can be configured to produce perforation holes 125 in a perforation hole pattern in the rear cover sheet 28 that facilitates the drying of excess water remaining in the gypsum board 25 in the kiln while helping to prevent the formation of steam within the board 25 (and/or to provide an outlet for any steam formed in the board 25) during the drying process.

In embodiments, the cover sheet perforator system 40 can be configured to produce variable perforation hole patterns. For example, in embodiments, the cover sheet perforator system 40 can be configured to produce perforation hole patterns with different perforation hole densities (holes per unit area), opening areas (aggregated area of perforation holes per unit area), row pitches (distance between adjacent perforation holes in a row along the cross machine direction 51), and hole spacings (distance between a perforation hole in one row along the cross-machine direction 51 to nearest perforation hole in an adjacent row along the machine direction 50) and with different perforation hole bar distances (distance of web of cover sheet material extending between adjacent perforation holes).

Figure 2:
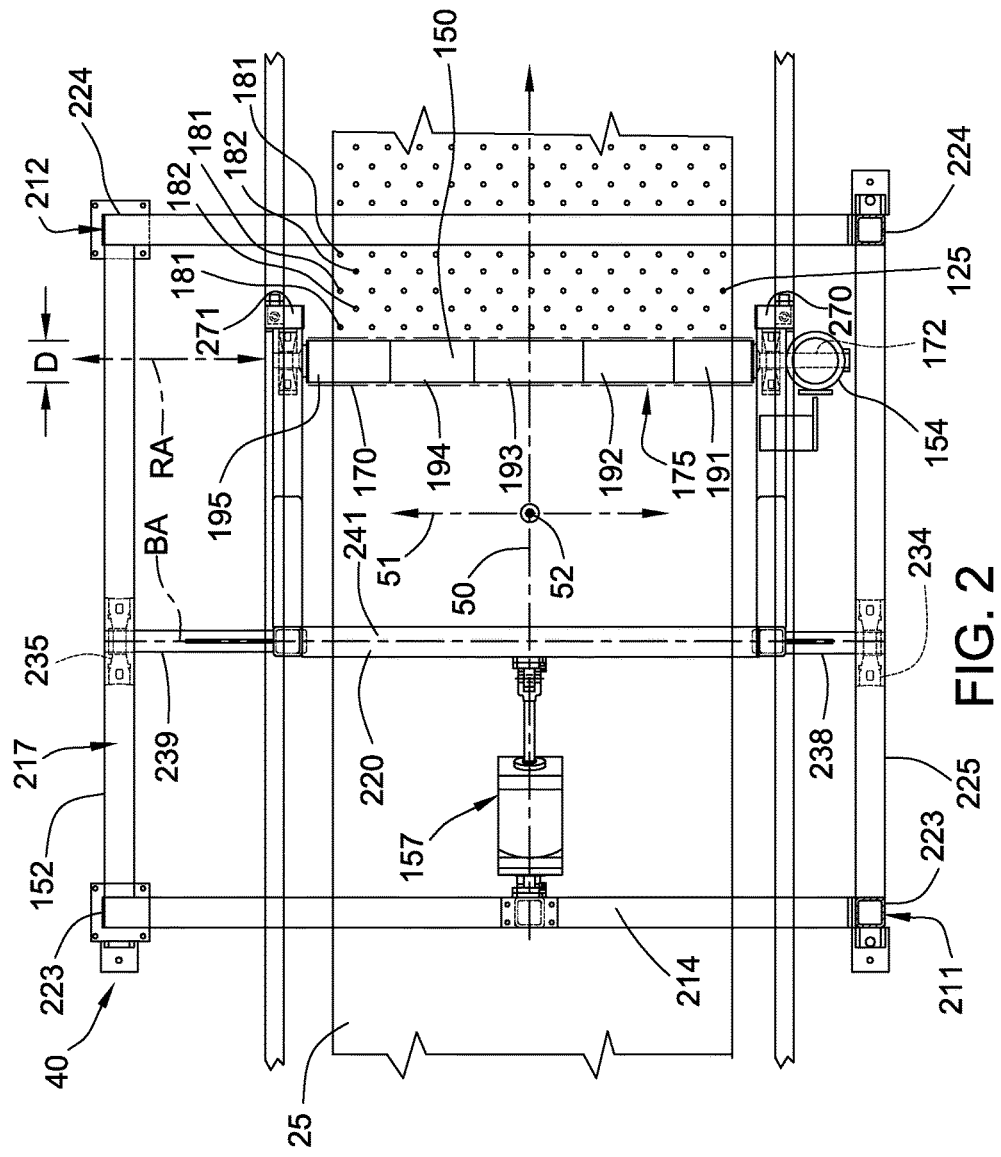
FIG. 2 is a top plan view of the cover sheet perforator system of FIG. 1 and a gypsum board supported by a conveyor of the manufacturing system of FIG. 1, with a roller support frame partially broken away for illustrative purposes.
Figure 3:
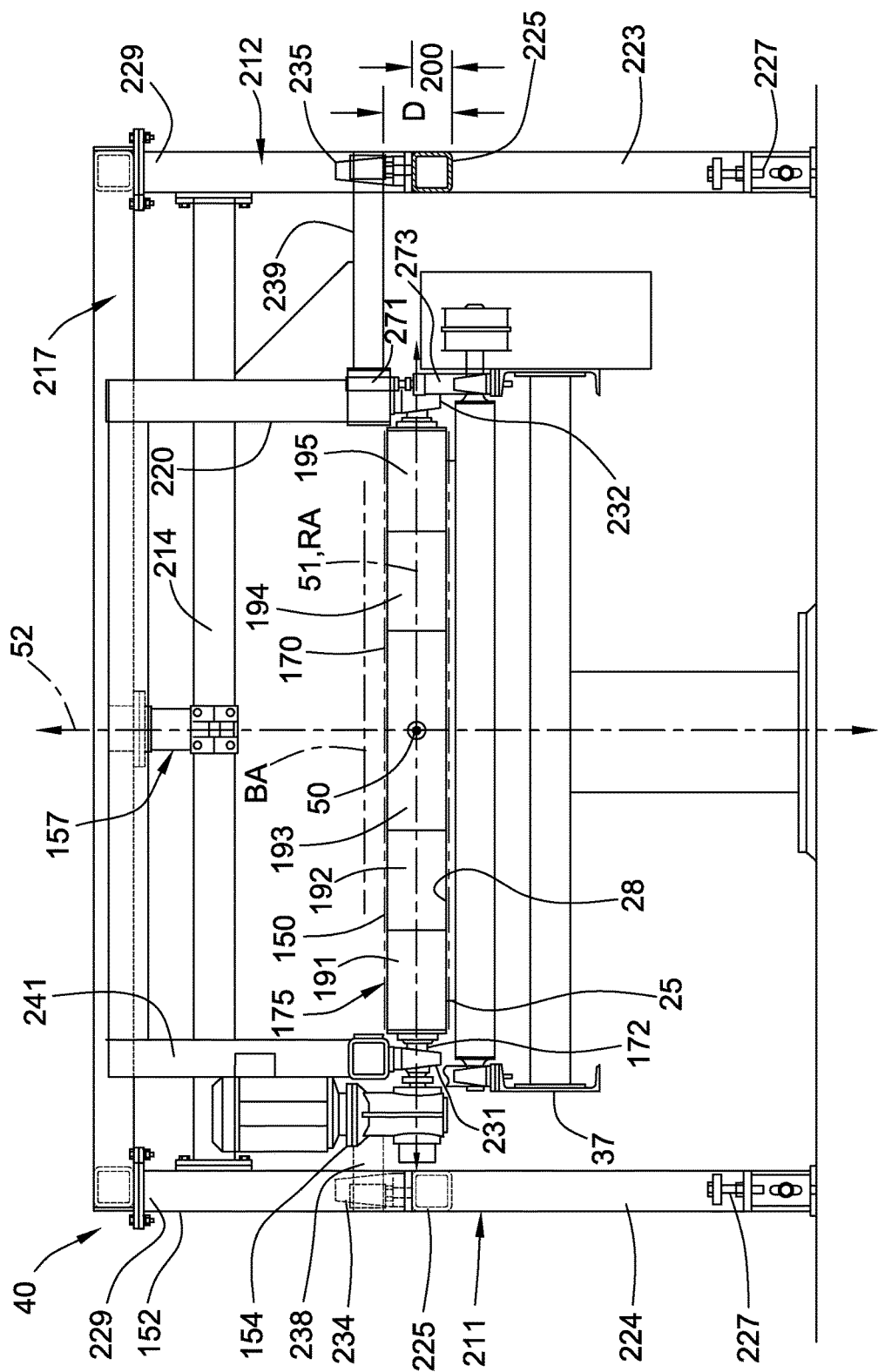
FIG. 3 is an end elevational view of the cover sheet perforator system of FIG. 1, with the roller support frame partially broken away for illustrative purposes.

Referring to FIGS. 1-3, the illustrated cover sheet perforator system 40 includes a perforator roller 150, a roller support frame 152, a motor 154, an actuator assembly 157, and a controller 159. The perforator roller 150 is disposed downstream of the forming station 35 along the machine direction 50. The perforator roller 150 is rotatably mounted to the roller support frame 152 such that the perforator roller 150 is rotatable about a rotational axis RA. The roller support frame 152 supports the perforator roller 150 such that the rotational axis RA extends along the cross-machine direction 51 (see FIGS. 2 and 3). The roller support frame 152 is adapted to place the perforator roller 150 in contacting relationship with the second cover sheet 28 of the gypsum board 25 moving at the line speed over the conveyor 37 (see FIGS. 1 and 3). The drive motor 154 is arranged with the perforator roller 150 to rotate the perforator roller 150 about the rotational axis RA. The drive motor 154 is adapted to rotate the perforator roller 150 to produce a series of perforation holes 125 in the second cover sheet 28 as the gypsum board 25 moves past the perforator roller 150 (see FIG. 2).

Referring to FIGS. 2 and 3, the perforator roller 150 has an outer circumference 170 with a roller diameter D. The perforator roller 150 includes a shaft 172 and a plurality of perforation pins 175 projecting from the shaft 172. The shaft 172 defines the rotational axis RA of the perforator roller 150 The perforation pins 175 defines the outer circumference 170 of the perforator roller 150. In embodiments, the arrangement of the perforation pins 175 circumferentially about the rotational axis RA defined by the shaft 172 and axially along the rotational axis RA can be varied to change the perforation hole pattern produced by the perforator roller 150 as it rotates about the rotational axis RA as discussed above.

For example, in embodiments, the perforation pins 175 can be arranged about and along the shaft 170 such that the perforator roller 150 produces rows 181, 182 of perforation holes 125 extending along the cross-machine direction 51 and in spaced relationship to each along the machine direction 50. In embodiments, adjacent rows 181, 182 of perforation holes 125 can be staggered such that the perforation holes 125 of one row 181 are in corresponding offset relationship to the perforation holes 125 of each adjacent row 182 of perforation holes, as shown in FIG. 2. In one embodiment, the row pitch along the cross-machine direction 51 is one-half inch, the row spacing along the machine direction 50 is one-half inch, and adjacent rows 181, 182 are staggered with a one-quarter inch offset. In embodiments, the row pitch along the cross-machine direction 51 and the row spacing along the machine direction 50 can be varied. In other embodiments, the perforation holes 125 can be arranged in rows which have perforation holes 125 that are respectively aligned along the cross-machine direction 51 with the perforation holes 125 in adjacent rows.

In embodiments, the perforator roller 154 can be configured such that the portion of the gypsum board 25 that is perforated and/or the pattern of the perforation holes 125 can be varied. For example, in the illustrated embodiment, the perforation pins 175 are mounted to a series of cylindrical segments 191, 192, 193, 194, 195 that are disposed around the shaft 172. In embodiments, different cylindrical segments having different perforation pin arrangements (or no pins) can be mounted to the shaft 172 to change the perforation hole pattern produced by the perforator roller 150 in the second cover sheet 28.

Referring to FIG. 3, the perforator roller 150 is wider (measured along the cross-machine direction 51) than the gypsum board 25. In the illustrated embodiment, the perforator roller 150 imparts a pattern of perforation holes substantially across the entire width of the second cover sheet 28 (measured along the cross-machine direction 51). In other embodiments, only the central field of the gypsum board 25 is perforated (e.g., the lateral distance along the cross-machine direction 51 between the tapered edges of the board 25). For example, in embodiments where the nominal width of the gypsum board 25 (along the cross-machine direction 51) is four feet, a central field portion which is about three-fourths of the width of the gypsum board 25 can be perforated.

Referring to FIG. 3, the perforator roller 150 is disposed above the gypsum board along a normal axis 52. The normal axis 52 is perpendicular to both the machine direction 50 and the cross-machine direction 51.

The perforator pins 175 are small rods that extend radially outwardly from the shaft 172 of the perforator roller 150. Each perforator pin 175 can be substantially the same and can include a distal piercing point adapted to pierce through the second cover sheet 28 to produce a perforation hole 125. In embodiments, the perforation pins 175 are generally conical such that each perforation pin 175 has a transverse area (measured perpendicular to the longitudinal axis of the perforation pin 175) that is smaller at its distal tip than it is at its base, which is closes to the shaft 172 of the perforator roller. In embodiments, the perforator pins 175 can have any suitable taper angle.

In embodiments, the perforator roller 150 is adjustably supported by the roller support frame 152 such that an offset distance 200 (measured along the normal axis 52 between the rotational axis RA of the perforator roller 150 (e.g., at the radial center of the shaft 172) and the second cover sheet 28 of the gypsum board is variable. By changing the offset distance 200 between the perforator roller 150 and the second cover sheet 28, the circumferential size of the resulting perforation holes 125 in the second cover sheet 28 can be varied. Decreasing the offset distance 200 increases the area of the perforation holes 125 produced by the tapered perforation pins 175 (i.e., the tapered perforation pins 175 penetrate more deeply into the gypsum board 25). Increasing the offset distance 200 decreases the area of the perforation holes 125 produced by the tapered perforation pins 175 (i.e., the tapered perforation pins 175 penetrate less deeply into the gypsum board 25).

It should be understood that, in embodiments, the perforation pins 175 can penetrate through the second cover sheet 28 and into the setting gypsum slurry of the gypsum board 25. In embodiments, the offset distance 200 is less than one half the diameter D of the perforator roller 150 such that the perforation pins 175 are in interfering relationship with the second cover sheet 28 of the gypsum board 25 to pierce the second cover sheet 28 as it passes by the perforator roller 150 along the machine direction 50.

In embodiments, the perforation pins 175 can be made from any suitable material, such as a metal, for example. In embodiments, the perforation pins 175 are made from a metal that permits the perforation pins 175 to flex slightly in response to the contact they intermittently make with the second cover sheet 28. By being sufficiently flexible, the perforation pins 175 can accommodate some variation in the tangential speed of the perforator roller at the line of contact with the gypsum board 25 and the line speed at which the board 25 is moving along the machine direction 50.

Referring to FIGS. 1-3, the roller support frame 152 is configured to support the perforator roller 150 over the conveyor 37. The roller support frame 152 includes first and second side frame assemblies 211, 212 disposed in spaced relationship to each other along the cross-machine direction 51 such that the conveyor 37 is interposed therebetween; a transverse support rail 214 extending along the cross-machine direction 51 over the conveyor 37 between the side frame assemblies 211, 212; a top frame assembly 217 extending between the side frame assemblies 211, 212 at a respective top end thereof; and a roller bracket 220.

The side frame assemblies 211, 212 have substantially the same construction and are mirror images of each other. Each side frame assembly 211, 212 includes a pair of uprights 223, 224 disposed in spaced relationship to each other along the machine direction 50 and a longitudinal roller bracket support rail 225 extending along the machine direction 50 between the respective uprights 223, 224 at an intermediate point along the normal axis 52.

Referring to FIG. 3, the uprights 223, 224 can be secured to the floor (or other support surface) via suitable mounting brackets 227 and extend along the normal axis 52. The top frame assembly 217 is mounted to respective upper ends 229 of the uprights 223, 224. Referring to FIGS. 1-3, the longitudinal roller bracket support rails 225 can be used to pivotably support the roller bracket 220 via a pair of bearings 234, 235 (such as a pillow block bearing, for example).

Referring to FIG. 2, the transverse support rail 214 extends between the upstream uprights 223 of the first and second side frame assemblies 211, 212 at an intermediate point along the normal axis 52. The transverse support rail 214 can be used as a mount for the actuator assembly 157, which is connected to both the transverse support rail 214 and the roller bracket 220.

Referring to FIGS. 1-3, the roller bracket 220 rotatably supports the perforator roller 150. Referring to FIGS. 2 and 3, the perforator roller 150 is journaled to the roller bracket 220 for rotation about the rotational axis RA. In the illustrated embodiment, the shaft 172 of the perforator roller 150 is rotatably supported by a pair of bearings 231, 231 (e.g., pillow block bearings) mounted to the roller bracket 220 such that the shaft 172 of the perforator roller 150 extends between the bearings 231, 232 to define the rotational axis RA.

Referring to FIG. 1, the roller bracket 220 is pivotally movable such that the roller bracket 220 is rotatable over a range of travel between an engaged position (as shown in FIG. 1) and a stowed position (as shown in broken lines in FIG. 1). The perforator roller 150 is positioned to be in contacting relationship with the gypsum board 25 being conveyed by the conveyor 37 when the roller bracket 220 is in the engaged position. The perforator roller 150 is positioned to be in non-contacting relationship with the gypsum board 25 being conveyed by the conveyor 37 when the roller bracket 220 is in the stowed position.

In the illustrated embodiment, the roller bracket 220 is pivotably mounted to the roller support frame 152 via the bearings 234, 235 respectively mounted to the first and second side frame assemblies 211, 212. The roller bracket 220 includes a pair of pivot shafts 238, 239 extending from its body 241 (as shown, e.g. in FIGS. 2 and 3). The pivot shafts 238, 239 are respectively inserted into the bearings 234, 235 to define a roller bracket pivot axis BA.

Figure 4:
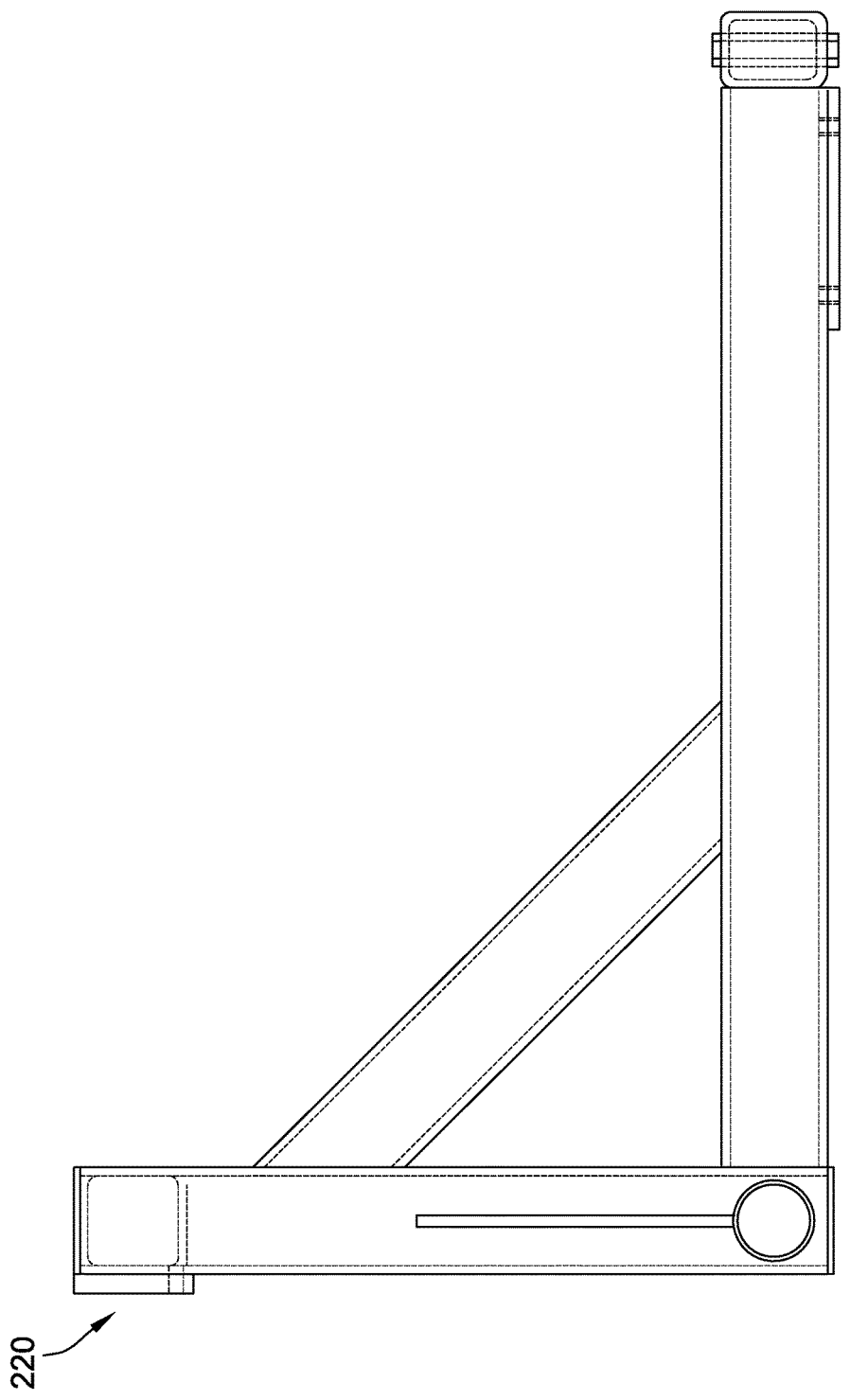
FIG. 4 is a side elevational view of a roller bracket of the cover sheet perforator system of FIG. 1.
Figure 6:
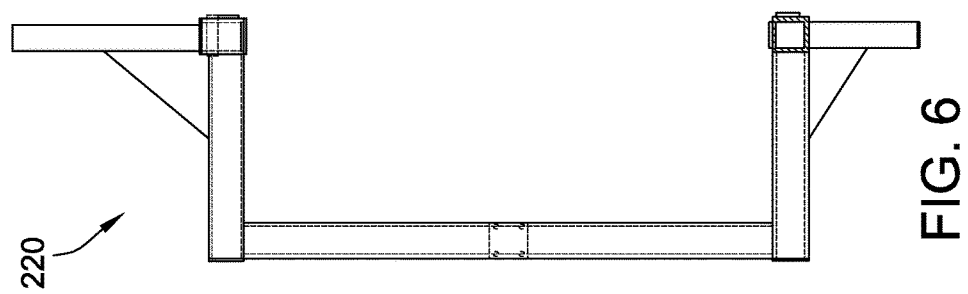
FIG. 6 is an end elevational view of the roller bracket of FIG. 4.
Figure 5:
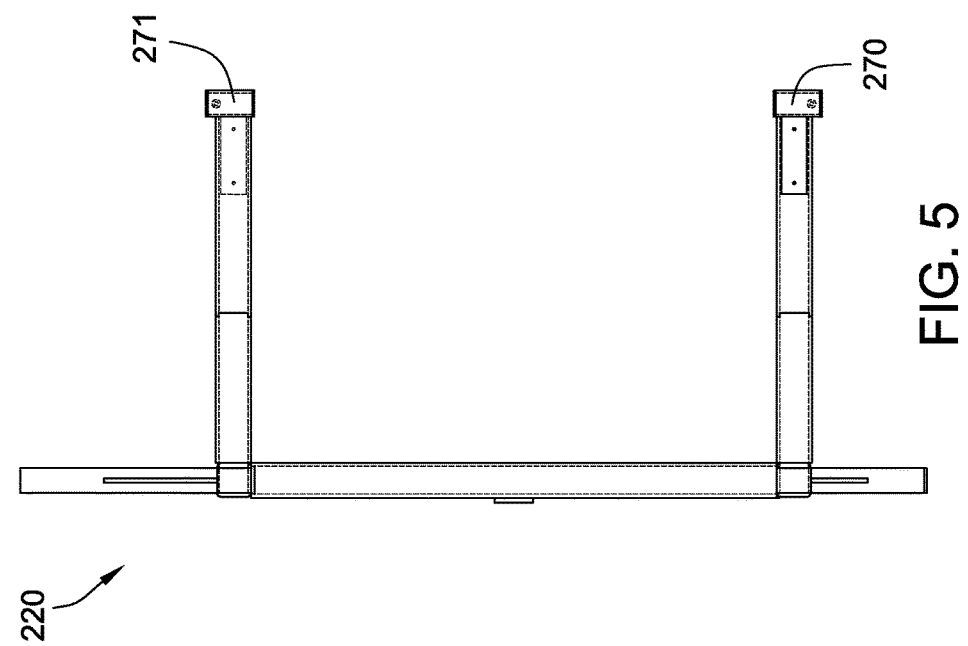
FIG. 5 is a top plan view of the roller bracket of FIG. 4.

Referring to FIGS. 4-6, the roller bracket 220 is shown disassembled form the rest of the roller support frame. Additional details concerning this exemplary embodiment of the roller bracket 220 will be apparent to one skilled in the art. It should be understood that, in other embodiments, the roller bracket can have a different construction.

Referring to FIG. 3, in embodiments, the roller support frame 152 is adapted to adjustably support the perforator roller 150 over the conveyor such that the offset distance 200 measured between the perforator roller 150 and the second cover sheet 28 of the gypsum board 25 being supported by the conveyor 37 is variable to selectively adjust the depth of penetration of the perforation pins 175 of the perforator roller 150 into the second cover sheet 28 of the gypsum board 25. For example, referring to FIG. 7, in embodiments, the support frame 152 includes a positioning element 270 and a bracket stop 272. The positioning element 270 is mounted to the roller bracket 220. The bracket stop 272 is mounted to the conveyor 37 such that the bracket stop 272 is in interfering relationship with positioning element 270 to limit the rotational movement of the roller bracket 220 in a direction 275 toward the conveyor 37 to define the engaged position (see, e.g., FIG. 1).

Referring to FIG. 7, in embodiments, the positioning element 270 is adjustably mounted to the roller bracket 220 such that a distal end 277 of the positioning element 270 is positioned a variable distance 278 from the hinge bracket 220 such that the offset distance 200 measured between the perforator roller 150 and the conveyor 37 when the hinge bracket 220 is in the engaged position is variable to selectively adjust a depth of penetration of the perforator roller 150 into the second cover sheet 28 of the gypsum board 25. In the illustrated embodiment, the positioning element 270 includes a threaded rod 280 that is threadingly engaged with a mounting body 282 secured to the roller bracket 220. The distal end 277 is in the form of a hemispherical contact button that is mounted to the threaded rod 280. The threaded rod 280 can have a threaded surface with a precision tolerance such that the rotation of the threaded rod 280 about its longitudinal axis by a fixed amount advances/retracts the contact button by a predetermined amount. A jam nut 284 can be provided to lock the threaded rod 280 in a desired position.

In embodiments, the bracket stop 272 can have any suitable construction which permits it to arrest the movement of the positioning element 270 to permit the positioning element to be used to adjustably locate the perforator roller 150 relative to the second cover sheet 28 of the gypsum board 25. In the illustrated embodiment, the bracket stop 272 comprises a post having a planar support end 287. The support end 287 is positioned such that the distal end 277 of the positioning element 270 comes to rest upon the support end 287 to define the engaged position of the roller bracket 220.

Referring to FIGS. 2 and 5, the illustrated roller support frame 152 includes a pair of positioning elements 270, 271 mounted to the downstream corners of the roller bracket 220 and a pair of associated bracket stops 272, 273 mounted to either side of the conveyor 37 (see, e.g., FIGS. 1 and 3). The positioning elements 270, 271 and the respective associated bracket stops 272, 273 can each be constructed in a similar manner.

Referring to FIGS. 7 and 8, in embodiments, the support frame 152 includes a stop pad 290 which has a predetermined pad thickness. The stop pad 290 is adapted to be interposed between the positioning element 270 and the bracket stop 272 to incrementally adjust the position of the engaged position in an amount correlated to the pad thickness. In embodiments, the pad thickness can be an incremental difference between two product thicknesses. For example, in embodiments, the pad thickness of the stop pad 290 can be correlated to a product thickness difference between two thickness types of gypsum board 25 produced by the system 20. In embodiments, the stop pad 290 can be used to make a change over from one-half inch thick board to five-eighths inch thick board.

In the illustrated embodiment, the stop pad 290 is pivotally mounted to the bracket stop 272 via a pivot block 292. Referring to FIG. 7, the stop pad 290 is pivoted off of the support end of the bracket stop 272 such that it is not being used to further define the engaged position of the roller bracket 220. The pivot block 292 is in contact with the side of the bracket stop 272 to limit the movement of the stop pad 290 away from the support end 287. In FIG. 8, the stop pad 290 has been pivoted into place upon the support end 287 such that the stop pad 290 is interposed between the positioning element 270 and the bracket stop 272 to further increase the distance the perforator roller 150 is from the conveyor 37.

Referring to FIGS. 1 and 2, the drive motor 154 is adapted to rotate the perforator roller 150 in a direction 295 with the gypsum board 25 at a point of contact between the outer circumference of the perforator roller 150 and the second cover sheet 28. The drive motor 154 is adapted to rotate the perforator roller 150 such that the outer circumference 170 of the perforator roller 150 has a tangential speed which substantially equal to the line speed at which the gypsum board 25 is moving. One of ordinary skill in the art will understand that the line sped at which the gypsum board is moving is a nominal line speed in embodiments. The nominal line speed can be established as a operational input by an operator. In some embodiments, the nominal line speed can based upon a line speed sensor measurement such as one located near the forming station 35 and/or the cutting station 45.

In embodiments, the motor 154 can be any suitable motor suitable for its intended purpose. In embodiments, the motor comprises a suitable gear motor and a variable frequency drive (VFD) that are configured to rotate the perforator roller 150 over a range of rotational speeds.

When the tangential speed of the perforator roller 150 and the line speed at which the gypsum board 25 is travelling become sufficiently different from each other, the shape of the perforation holes 125 can change from circular to an oval shape. In embodiments, the operation of the motor 154 can be controlled to produce perforation holes 125 which have a shape conforming to a predetermined shape profile tolerance. In embodiments, a vision system can be provided to help control the operation of the motor 154 to maintain a desired shape for the perforation holes.

Referring to FIG. 1, the actuator assembly 157 is adapted to selectively move the roller bracket 220 over the range of travel between the engaged position and the stowed position. The actuator assembly 157 includes a linear actuator 310 and a linear actuator power source 312. In embodiments, the linear actuator is mounted to at least the roller bracket 220 of the support frame 152. In the illustrated embodiment, the linear actuator 310 is mounted to the roller bracket 220 and to the transverse support rail 214 of the roller support frame 152. In embodiments, the linear actuator can comprise any suitable actuator configured to selectively rotate the roller bracket over the range of travel between the stowed position and the engaged position. The linear actuator power source 312 is configured to selectively operate the linear actuator 310 such that the linear actuator 310 moves the roller bracket 220 over the range of travel. In the illustrated embodiment, the linear actuator 310 comprises an air cylinder, and the power source 312 comprises a supply of compressed air.

Referring to FIG. 1, the controller 159 is in operable arrangement with the linear actuator power source 312 and with the motor 154. In embodiments, the controller 159 is configured to selectively operate the linear actuator power source 312 to move the roller bracket 220 from the engaged position to the stowed position in response to a command signal being received by the controller 159. In embodiments the flow of pressurized air from the power source 312 to the air cylinder 310 is controlled by the controller 159 via a suitable valve system. In embodiments, the controller 159 can be programmed to control the operation of the motor 154 to variably change the rotational speed of the perforator roller 150. In embodiments, the controller 159 can be used to help operate the perforator roller 150 such that a tangential speed thereof is within a predetermined tolerance of the line speed at which the gypsum board 25 is moving along the machine direction 50.

Referring to FIG. 1, the cutting station 45 is disposed downstream of the forming station 35 along the machine direction 50. The cutting station 45 is arranged with respect to the conveyor 37 such that the conveyor 37 carries the gypsum board 25 past the cutting station 45. The cutting station 45 can include a knife configured to periodically cut the gypsum board 25 along the cross-machine direction 51 to define a series of board segments as the cementitious board 25 moves along the machine direction 50 past the cutting station 45. In embodiments, the knife can be a rotary knife as is generally known to those skilled in the art.

In embodiments, the perforator roller 150 of the cover sheet perforator system 40 is located upstream of the cutting station 45 along the machine direction 50. In the illustrated embodiment, the perforator roller 150 of the cover sheet perforator system 40 is disposed along the machine direction 50 between the forming station 35 and the cutting station 45.

In embodiments, the controller 159 can be configured to control the operation of the rotary knife of the cutting station 45. In embodiments, the controller 159 can adjust the rotational speed of the rotary knife based upon the line speed of the board line (as detected by a suitable sensor, for example) to produce board segments of substantially the same length under different line speed conditions.

In embodiments, the system 20 for manufacturing a cementitious board 25 can include other components and stations. For example, in embodiments, the system 20 can include a transfer system, including a board inverter; a kiln; and a bundler and taping station, all downstream of the cutting station 45.

In embodiments of a method of manufacturing a gypsum board following principles of the present disclosure, a cover sheet perforator system constructed according to principles of the present disclosure is used to make a gypsum board with a perforated cover sheet as discussed herein. In embodiments, a method of manufacturing a gypsum board following principles of the present disclosure can be used with any embodiment of a system for manufacturing a gypsum board according to principles discussed herein.

For example, in embodiments, a method of manufacturing a gypsum board following principles of the present disclosure includes conveying the gypsum board along a machine direction away from a forming station to a perforator roller. The gypsum board has a core interposed between a first cover sheet and a second cover sheet. The core comprises an aqueous gypsum slurry. The gypsum board extends along the machine direction and along a cross-machine direction. The cross-machine direction is perpendicular to the machine direction. The perforator roller is disposed downstream of the forming station along the machine direction.

The gypsum board is passed along the machine direction underneath the perforator roller. The perforator roller is in contacting relationship with the second cover sheet of the gypsum board. The perforator roller is rotated via a drive motor about a rotational axis extending along the cross-machine direction to produce a series of perforation holes in the second cover sheet as the gypsum board moves past the perforator roller in the machine direction. In embodiments of a method of manufacturing a gypsum board following principles of the present disclosure, the drive motor rotates the perforator roller in a direction with the gypsum board at a point of contact between an outer circumference of the perforator roller and the second cover sheet.

In embodiments, the gypsum board is conveyed away from the forming station at a line speed along the machine direction. The drive motor can rotate the perforator roller such that the outer circumference of the perforator roller has a tangential speed which is substantially equal to the line speed.

In embodiments, the method further includes adjusting a depth of penetration of the perforator roller into the second cover sheet of the gypsum board by changing an offset distance measured between the perforator roller and the conveyor. The offset distance is measured along a normal axis which is perpendicular to both the machine direction and the cross-machine direction. In embodiments, the offset distance is incrementally changed in an amount correlated to a change in thickness of the gypsum board.

In embodiments, the method further includes periodically cutting the gypsum board to define a series of board segments as the gypsum board moves along the machine direction past a cutting station. The cutting station id disposed downstream of the forming station along the machine direction. The perforator roller is interposed between the forming station and the cutting station along the machine direction. In embodiments, the perforator roller is disposed downstream of the forming station along the machine direction a sufficient distance to allow the aqueous gypsum slurry comprising the core to set before perforating the second cover sheet.

In embodiments, the method further includes moving the perforator roller into a stowed position such that the perforator roller is placed in non-contacting relationship with the gypsum board. The perforator roller can be moved back into place in the engaged position when it is desired to resume perforating the gypsum board.

In embodiments, the core of the gypsum board comprises a core layer and a concentrated layer. The core layer is formed from a core slurry comprising at least water and stucco, and the concentrated layer is formed from a concentrated slurry comprising at least water, stucco, and an enhancing additive. The enhancing additive is present in a more concentrated amount by weight percentage in the concentrated slurry than in the core slurry.

In embodiments, the core layer is interposed along a normal axis between the second cover sheet and the concentrated layer. The normal axis is perpendicular to both the machine direction and the cross-machine direction.

Referring to FIG. 9, an embodiment of a gypsum board 25 made according to principles of the present disclosure is shown. The gypsum board 25 includes a first cover sheet 27, a second cover sheet 28, and a gypsum core 29. The gypsum core 29 is interposed between the first and second cover sheets 27, 28. The gypsum core 29 includes a core layer 30 and a concentrated layer 31. The core layer 30 includes set gypsum formed from a core slurry comprising at least water and stucco. The concentrated layer 31 includes set gypsum formed from a concentrated slurry comprising at least water, stucco, and an enhancing additive. The enhancing additive is present in a more concentrated amount (by weight percentage) in the concentrated slurry than what is present in the core slurry. At least one of the cover sheets 27, 28 is perforated such that said cover sheet defines a plurality of perforation holes 125 therein. In the illustrated embodiment, the second cover sheet 28 is perforated.

In embodiments, the core layer 30 is interposed between the second cover sheet 28 and the concentrated layer 31. In the illustrated embodiment, the core layer 30 is contiguous with the second cover sheet 28. In embodiments, a skim coat layer can be interposed between the second cover sheet 28 and the core layer 30 which is made from a slurry that is denser than the slurry from which the core layer 30 is made.

In embodiments, the core layer 30 is closer along the normal axis 52 to the second cover sheet 28 than is the concentrated layer 31. The normal axis 52 is perpendicular to both the machine direction 50 and the cross-machine direction 51.

In embodiments, the core layer 30 is formed from an aqueous gypsum slurry having a first formulation. The gypsum board 25 has a pair of edge layers 95 extending longitudinally along the machine direction 50 (one of which being shown) that are formed from a slurry having a second formulation which is different from the first formulation. The edge layers 95 are disposed in lateral spaced relationship to each other along the cross-machine direction 51 which is perpendicular to the machine direction 50. Each edge layer 95 is generally C-shaped in transverse cross-section. The edge layers 95 are in bonding relationship with the face cover sheet 27 and with the core layer 30.

In embodiments, each edge layer 95 can be applied to the face cover sheet 27 of the gypsum board 25 such that the edge layer 95 extends from one face of the gypsum board 27 (in this case, the front face) and around the edge wall 105 of the gypsum board 25. In the illustrated embodiment, the edge layer 95 extends around the edge wall 105 such the edge layer 95 is in bonding relationship with at least a portion of the connecting flap 107 of the front cover sheet 27.

In embodiments, the edge layers 95 have a thickness that is less than half of the nominal thickness of the gypsum board, which is measured along the normal axis 52. In this way, each edge layer 95 takes on a C-shaped cross section wherein a portion 315 of the core layer 30 is interposed between a pair of face portions 320, 321 of the edge layer 95 along the normal axis 52. The face portions 320, 321 are connected to the face cover sheet 27 and the connecting flap 107, respectively. A wall portion 325 of the edge layer 95 is bonded to the edge wall 105 of the gypsum board 25. The face portions 320, 321 extend along the machine direction 50 and the cross machine direction 51. The wall portion 325 extends along the machine direction 50 and the normal axis 52.

In embodiments, the gypsum board 25 includes the concentrated layer 31 which extends laterally between the edge layers 95. In the illustrated embodiment, the concentrated layer 31 is formed form the slurry having the second formulation along with the edge layers 95. The concentrated layer 31 is substantially contiguous with the edge layers 95. The concentrated layer 31 is in bonding relation to the face cover sheet 27 and to the core layer 30. The concentrated layer 31 extends in the cross-machine direction 51 substantially between the edge layers 95.

The back cover sheet 28 can be connected to the face cover sheet 27 using any suitable technique. For example, in the illustrated embodiment, the back cover sheet 28 is connected to the connecting flaps 107 via a suitable adhesive.

All references cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for manufacturing a gypsum board, the gypsum board having a gypsum core, a first cover sheet, and a second cover sheet, the gypsum core being interposed between the first and second cover sheets, the system comprising:
a forming station, the forming station adapted to form the gypsum board such that the gypsum board is within a predetermined thickness range;
a conveyor, the conveyor adapted to convey the gypsum board at a line speed along a machine direction away from the forming station, the conveyor configured to support the gypsum board such that the first cover sheet of the gypsum board is resting upon the conveyor, the conveyor extending along the machine direction and along a cross-machine direction, the cross-machine direction being perpendicular to the machine direction;
a cutting station, the cutting station disposed downstream of the forming station along the machine direction, the cutting station arranged with respect to the conveyor such that the conveyor carries the gypsum board past the cutting station, the cutting station including a knife configured to periodically cut the gypsum board along the cross-machine direction to define a series of board segments as the gypsum board moves along the machine direction past the cutting station;
a cover sheet perforator system, the cover sheet perforator system including a perforator roller, a roller support frame, and a drive motor:
the perforator roller disposed along the machine direction between the forming station and the cutting station, the perforator roller including a shaft and a plurality of perforation pins projecting from the shaft, the shaft being rotatably mounted to the roller support frame such that the perforator roller is rotatable about a rotational axis, the perforator roller having an outer circumference defined by the perforation pins, the roller support frame supporting the shaft of the perforator roller such that the rotational axis extends along the cross-machine direction, and the roller support frame adapted to place the pins of the perforator roller in contacting relationship with the second cover sheet of the gypsum board conveyed by the conveyor, the roller support frame including a roller bracket, the shaft of the perforator roller being journaled to the roller bracket for rotation about the rotational axis, and the roller bracket being pivotally movable such that the perforator roller is movable over a range of travel between an engaged position and a stowed position, the perforator roller being positioned when in the engaged position to be in contacting relationship with the gypsum board being conveyed by the conveyor, and the perforator roller being positioned when in the stowed position to be in non-contacting relationship with the gypsum board being conveyed by the conveyor, and the drive motor being mounted to the shaft of the perforator roller to rotate the perforator roller about the rotational axis, the drive motor being adapted to rotate the perforator roller to produce a series of perforation holes in the second cover sheet as the gypsum board moves past the perforator roller, the drive motor being adapted to rotate the perforator roller (i) in a direction with the gypsum board at a point of contact between the outer circumference of the perforator roller and the second cover sheet and (ii) such that the outer circumference of the perforator roller has a tangential speed, the tangential speed being substantially equal to the line speed.

2. The system for manufacturing according to claim 1, wherein the roller support frame is adapted to adjustably support the perforator roller over the conveyor such that an offset distance measured between the perforator roller and the conveyor is variable to selectively adjust a depth of penetration of the perforator roller into the second cover sheet of the gypsum board, the offset distance being measured along a normal axis which is perpendicular to both the machine direction and the cross-machine direction.

3. The system for manufacturing according to claim 1, wherein the cover sheet perforator system includes an actuator assembly, the actuator assembly being adapted to selectively move the roller bracket over the range of travel between the engaged position and the stowed position.

4. The system for manufacturing according to claim 3, wherein the actuator assembly includes a linear actuator and a linear actuator power source, the linear actuator being mounted to at least the roller bracket of the support frame, the linear actuator power source being configured to selectively operate the linear actuator such that the linear actuator moves the roller bracket over the range of travel.

5. The system for manufacturing according to claim 1, wherein the roller support frame includes a positioning element and a bracket stop, the positioning element being mounted to the roller bracket, and the bracket stop being mounted to the conveyor such that the bracket stop is in interfering relationship with positioning element to limit the rotational movement of the roller bracket in a direction toward the conveyor to define the engaged position.

6. The system for manufacturing according to claim 5, wherein the positioning element is adjustably mounted to the roller bracket such that a distal end of the positioning element is positioned a variable distance from the roller bracket such that an offset distance measured between the perforator roller and the conveyor when the roller bracket is in the engaged position is variable to selectively adjust a depth of penetration of the perforator roller into the second cover sheet of the gypsum board, the offset distance being measured along a normal axis which is perpendicular to both the machine direction and the cross-machine direction.

7. The system for manufacturing according to claim 6, wherein the support frame includes a stop pad, the stop pad having a pad thickness, the stop pad being adapted to be interposed between the positioning element and the bracket stop to incrementally adjust the position of the engaged position in an amount correlated to the pad thickness.

8. The system for manufacturing according to claim 6, wherein the positioning element includes a threaded rod that is threadingly engaged with a mounting body secured to the roller bracket, and wherein the distal end of the positioning element comprises a hemispherical contact button that is mounted to the threaded rod.

9. The system for manufacturing according to claim 8, wherein, the bracket stop comprises a post having a support end positioned such that the distal end of the positioning element comes to rest upon the support end to establish the engaged position of the roller bracket.

10. The system for manufacturing according to claim 1, wherein the roller support frame includes first and second side frame assemblies disposed in spaced relationship to each other along the cross-machine direction such that the conveyor is interposed therebetween and a transverse support rail extending along the cross-machine direction over the conveyor between the first and second side frame assemblies, the roller bracket pivotally connected to the first and second frame assemblies.

11. The system for manufacturing according to claim 10, wherein the cover sheet perforator system includes an actuator assembly, the actuator assembly being adapted to selectively move the roller bracket over the range of travel between the engaged position and the stowed position, and the actuator assembly being mounted to both the roller support frame and the roller bracket.

12. The system for manufacturing according to claim 11, wherein the actuator assembly is mounted to the transverse support rail of the roller support frame.

13. The system for manufacturing according to claim 10, wherein the first and second side frame assemblies each includes a pair of uprights and a longitudinal roller bracket support rail, the pair of uprights disposed in spaced relationship to each other along the machine direction and extending along a normal axis which is perpendicular to both the machine direction and the cross-machine direction, and the longitudinal roller bracket support rail extending along the machine direction between the respective uprights at an intermediate point along the normal axis.

14. The system for manufacturing according to claim 13, wherein the longitudinal roller bracket support rails pivotably support the roller bracket via a pair of bracket bearings.

15. The system for manufacturing according to claim 14, wherein the roller bracket includes a pair of pivot shafts extending from a body thereof, the pair of pivot shafts being respectively inserted into the pair of bracket bearings to define a roller bracket pivot axis.

16. The system for manufacturing according to claim 1, wherein the shaft of the perforator roller is rotatably supported by a pair of shaft bearings mounted to the roller bracket such that the shaft of the perforator roller extends between the pair of shaft bearings to define the rotational axis.

17. The system for manufacturing according to claim 16, wherein the roller support frame includes first and second side frame assemblies disposed in spaced relationship to each other along the cross-machine direction such that the conveyor is interposed therebetween and a transverse support rail extending along the cross-machine direction over the conveyor between the first and second side frame assemblies, the roller bracket pivotally connected to the first and second frame assemblies.

18. The system for manufacturing according to claim 17, wherein the cover sheet perforator system includes an actuator assembly, the actuator assembly being adapted to selectively move the roller bracket over the range of travel between the engaged position and the stowed position, and the actuator assembly being mounted to both the roller support frame and the roller bracket.

19. The system for manufacturing according to claim 18, wherein the actuator assembly is mounted to the transverse support rail of the roller support frame.

\* \* \* \* \*